(12) United States Patent
Krishnamurthy et al.

(10) Patent No.: US 9,253,034 B1
(45) Date of Patent: Feb. 2, 2016

(54) MASS ACTIVATION OF NETWORK DEVICES

(75) Inventors: Pradeep H. Krishnamurthy, Bangalore (IN); Kent A. Watsen, Leesburg, VA (US); Roshan Joyce, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 110 days.

(21) Appl. No.: 12/502,846

(22) Filed: Jul. 14, 2009

Related U.S. Application Data

(60) Provisional application No. 61/182,960, filed on Jun. 1, 2009.

(51) Int. Cl.
*G06F 15/177* (2006.01)
*H04L 12/24* (2006.01)

(52) U.S. Cl.
CPC .................................. *H04L 41/0806* (2013.01)

(58) Field of Classification Search
USPC ........................................................ 709/228
See application file for complete search history.

(56) References Cited

U.S. PATENT DOCUMENTS

| | | | |
|---|---|---|---|
| 7,072,946 B2 | 7/2006 | Shafer | |
| 7,730,179 B2* | 6/2010 | Tanner | 709/224 |
| 7,844,718 B2 | 11/2010 | Polcha et al. | |
| 7,853,676 B1 | 12/2010 | Freskos et al. | |
| 7,926,033 B2 | 4/2011 | Gopal et al. | |
| 8,051,416 B2* | 11/2011 | Grund et al. | 717/172 |
| 8,156,213 B1 | 4/2012 | Deng et al. | |
| 8,161,227 B1 | 4/2012 | Diggs et al. | |
| 2002/0178380 A1 | 11/2002 | Wolf et al. | |
| 2004/0030891 A1 | 2/2004 | Kurihara | |
| 2004/0261116 A1 | 12/2004 | Mckeown et al. | |
| 2004/0264698 A1 | 12/2004 | Oda | |
| 2005/0182948 A1 | 8/2005 | Ducharme | |
| 2007/0047735 A1 | 3/2007 | Celli et al. | |
| 2007/0268516 A1* | 11/2007 | Bugwadia et al. | 358/1.15 |
| 2008/0301666 A1* | 12/2008 | Gordon et al. | 717/172 |
| 2009/0198797 A1* | 8/2009 | Wang et al. | 709/220 |
| 2009/0254639 A1* | 10/2009 | Manchester et al. | 709/220 |
| 2010/0250939 A1 | 9/2010 | Adams et al. | |

OTHER PUBLICATIONS

Enns, "NETCONF Configuration Protocol," Network Working Group, http://www.ietf.org/rfc/rfc4741.txt, Dec. 2006, 89 pp.

(Continued)

*Primary Examiner* — Ryan Jakovac
(74) *Attorney, Agent, or Firm* — Shumaker & Sieffert, P.A.

(57) ABSTRACT

Techniques are described for initializing a plurality of network devices with similar network configurations, such as a common management device, platform, operating system, and network hostname. In one example, a management device comprises a computer-readable medium encoded with instructions for a configlet generator module and a device manager module and a processor to execute modules stored in the computer-readable medium of the management device. The processor executes the configlet generator module to generate a bulk configlet for a plurality of network devices, wherein the bulk configlet comprises a bulk identifier. The processor also executes the device manager module to receive a network session request from one of the plurality of network devices, wherein the network session request includes the bulk identifier, and to send specific configuration data to the one of the plurality of network devices in response to the network session request.

32 Claims, 14 Drawing Sheets

(56) References Cited

OTHER PUBLICATIONS

Kipp et al., "The Virtual Fabrics MIB," Network Working Group, http://www.iett.org/rfc/rfc4747.txt, Dec. 2008, 19 pp.

Netconf, "Motivation and overview," http://netconf.alioth.debian.org, Oct. 17, 2008, 4 pp.

W3C, Extensible Markup Language (XML) 1.0 (Fifth Edition), W3C Recommendation, http://www.w3.org/TR/REC-xml/, Nov. 26, 2008, 63 pp.

W3C, XML Schema Part 0: Primer Second Edition, W3C Recommendation, editors David C. Fallside and Priscilla Walmsley, Oct. 28, 2004, 77 pp.

W3C, XML Schema Part 1: Structures Second Edition, W3C Recommendation, editors Henry S. Thompson et al., http://www.w3.org/TR/xmlschema-1/, Oct. 28, 2004, 202 pp.

W3C, XML Schema Part 2: Datatypes Second Edition, W3C Recommendation, editors Paul V. Biron and Ashok Malhotra, Oct. 28, 2004, 153 pp.

U.S. Appl. No. 12/510,062, entitled "Merging Network Device Configuration Schemas," filed Jul. 27, 2009.

* cited by examiner

MASS ACTIVATION OF NETWORK DEVICES

This application claims the benefit of U.S. Provisional Application No. 61/182,960, filed Jun. 1, 2009, which is hereby incorporated by reference in its entirety.

COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to network devices and, more particularly, to deployment and activation of network devices.

BACKGROUND

Large enterprises often face the challenge of mass distribution and deployment of network infrastructure. For example, an enterprise may operate a number of geographically distributed facilities (e.g., offices, retail outlets, and the like) that require network connectivity to a central or main office of the enterprise and optionally to each other. In such cases, a challenge arises when the enterprise desires to install or upgrade network devices with each of the many remote facilities. For example, a central information technology (IT) administrative group of the enterprise may coordinate an effort to upgrade computers, firewalls, gateways, routers, VPN appliances, switches or other network equipment in each of the remote facilities. Such operations may require deployment and activation of hundreds or sometimes thousands of devices.

To simplify the process, the enterprise may purchase similar network devices for deployment at the remote facilities in a single mass rollout. By purchasing similar if not the same network devices, the enterprise may ease administrative burdens with respect to deploying and operating these network devices. In such cases, it is common for the enterprise to contract with the manufacturer to ship the units directly to the remote facilities. This saves shipping costs and offers the advantage of alleviating the central IT group from having the burden of physically receiving and reshipping the devices. However, when devices are shipped directly from the manufacturer to the final location at which the devices are to be deployed, it may not always be possible for a trained network administrator to be physically manipulate the devices to ensure proper installation and activation. As a result, the person who configures the devices is typically a store manager or other person who does not have experience in configuring network devices. In such cases, it may be difficult to ensure that the devices are correctly deployed and activated in a manner so as to match a centralized device management system often maintained by the IT group for remotely monitoring and managing devices in the enterprise.

Conventional methods for controlling the deployment of the devices within the remote facilities rely the creation and distribution of a device-specific "configlet" for each of the network devices being activated. A configlet is software that generally includes sufficient configuration data to deploy the particular configuration device in its target environment so as to allow the corresponding device to come online and connect to the centralized device management system. In such cases, experienced administrators of the IT group create the device-specific configlets and ship storage media (e.g., USB drives) containing each of the configlets to the corresponding remote facilities to which the respective devices where shipped. To properly manage the devices and ensure consistency with the centralized device management system, the network administrators must ensure that the correct configlets are shipped to the correct remote facilities and, therefore, applied to the correct network devices.

SUMMARY

In general, this disclosure describes mass activation techniques for rapidly deploying and activating a large number of devices of similar configuration in remote geographic locations. A network administrator for the enterprise manages network devices of the enterprise using a management device of an element management system (EMS). The administrator uses the management device to model the network devices, including configuration data that is common to the network devices, and, from the model, develops a bulk configlet for the similar network devices in accordance with the techniques described in this disclosure. In one example, the administrator interacts with the management device to specify a number of devices that are to be mass deployed, and the management device automatically creates an equivalent number of device objects in a database, plus an additional "bulk" device object. Copies of the bulk configlet are sent to the remote locations at which the network devices are to be deployed by encoding the bulk configlet on computer-readable storage media, such as a flash drive sometimes referred to as thumb drives or pen drives.

The bulk configlet generally includes the minimum set of configuration data required to enable a network device of a certain type, e.g., to initialize a network stack for the device and to connect to a management device. A network device being activated checks for the presence of the bulk configlet during bootup. When the bulk configlet is present, the network device bootstraps from the bulk configlet. The network device also executes instructions of the bulk configlet and uses configuration data of the bulk configlet to connect to a remote management device, retrieve configuration data specific to the network device from the management device, store the specific configuration data, and use the specific configuration data to communicate with the management device in subsequent communication sessions. The bulk configlet includes a bulk identifier that the network device uses to identify itself to the management device, so that upon receiving the initial communication the management device is able to determine that the network device is connecting using the bulk configlet and that the network device requires specific configuration data. The management device queries the database of the EMS with the received identifier to determine that the bulk identifier matches the bulk device object in the database. The management device then determines that the connecting network device requires specific configuration data, so the management device associates the network device with a device object and sends configuration data from the device object to the network device. The specific configuration data includes a specific identifier for the corresponding device.

In one example, a method includes generating, with a management device, a bulk configlet for a plurality of network devices, wherein the bulk configlet comprises a bulk identifier, receiving a network session request from one of the plurality of network devices, wherein the network session request includes the bulk identifier, and sending specific configuration data to the one of the plurality of network devices in response to the network session request.

In another example, a management device includes a computer-readable medium encoded with instructions for a configlet generator module and a device manager module, and a processor to execute modules stored in the computer-readable medium of the management device, wherein the processor executes the configlet generator module to generate a bulk configlet for a plurality of network devices, wherein the bulk configlet comprises a bulk identifier, and wherein the processor executes the device manager module to receive a network session request from one of the plurality of network devices, wherein the network session request includes the bulk identifier, and to send specific configuration data to the one of the plurality of network devices in response to the network session request.

In another example, a computer-readable medium, such as a computer-readable storage medium, contains, e.g., is encoded with, instructions that cause a programmable processor to generate a bulk configlet for the plurality of network devices, wherein the bulk configlet comprises a bulk identifier, receive a network session request from one of the plurality of network devices, wherein the network session request includes the bulk identifier, and send specific configuration data to the one of the plurality of network devices in response to the network session request.

In another example, a system includes a plurality of network devices, a management device comprising, a computer-readable medium encoded with instructions for a configlet generator module and a device manager module, and a processor to execute modules stored in the computer-readable medium of the management device, wherein the processor executes the configlet generator module to generate a bulk configlet for the plurality of network devices, wherein the bulk configlet comprises a bulk identifier, and to encode the bulk configlet to a second computer-readable medium, and wherein the processor executes the device manager module to receive a network session request from one of the plurality of network devices, wherein the network session request includes the bulk identifier, and to send specific configuration data to the one of the plurality of network devices, wherein the specific configuration data comprises a unique Internet protocol address and a unique device name, and wherein the one of the plurality of network devices is configured to load the bulk configlet from the second computer-readable medium, send the bulk identifier to the management device in response to the network session request, receive the specific configuration data from the management device, and store the specific configuration data.

In another example, a method includes loading, with a network device, a bulk configlet, executing the bulk configlet during a boot cycle to establish a network session with a management device, sending a bulk identifier to the management device, and receiving specific configuration data from the management device, wherein the specific configuration data comprises an Internet protocol address and a device name.

The techniques of this disclosure may provide one or more advantages. For example, the techniques of this disclosure may simplify the task of deploying and enabling a large number of similar devices. This may be especially true when a manager or other user tasked with the responsibility to deploy and enable the devices is not technically "savvy" or familiar with network devices, when the devices are deployed in remote locations from each other, and when users of the device are not aware of necessary management configurations to be managed by a management device. Moreover, the techniques of this disclosure may simplify the task of applying the same configuration to each of the newly deployed devices and identifying which managed element in a management system corresponds to each physical device.

The details of one or more examples are set forth in the accompanying drawings and the description below. Other features, objects, and advantages will be apparent from the description and drawings, and from the claims.

DETAILED DESCRIPTION

Figure 1:
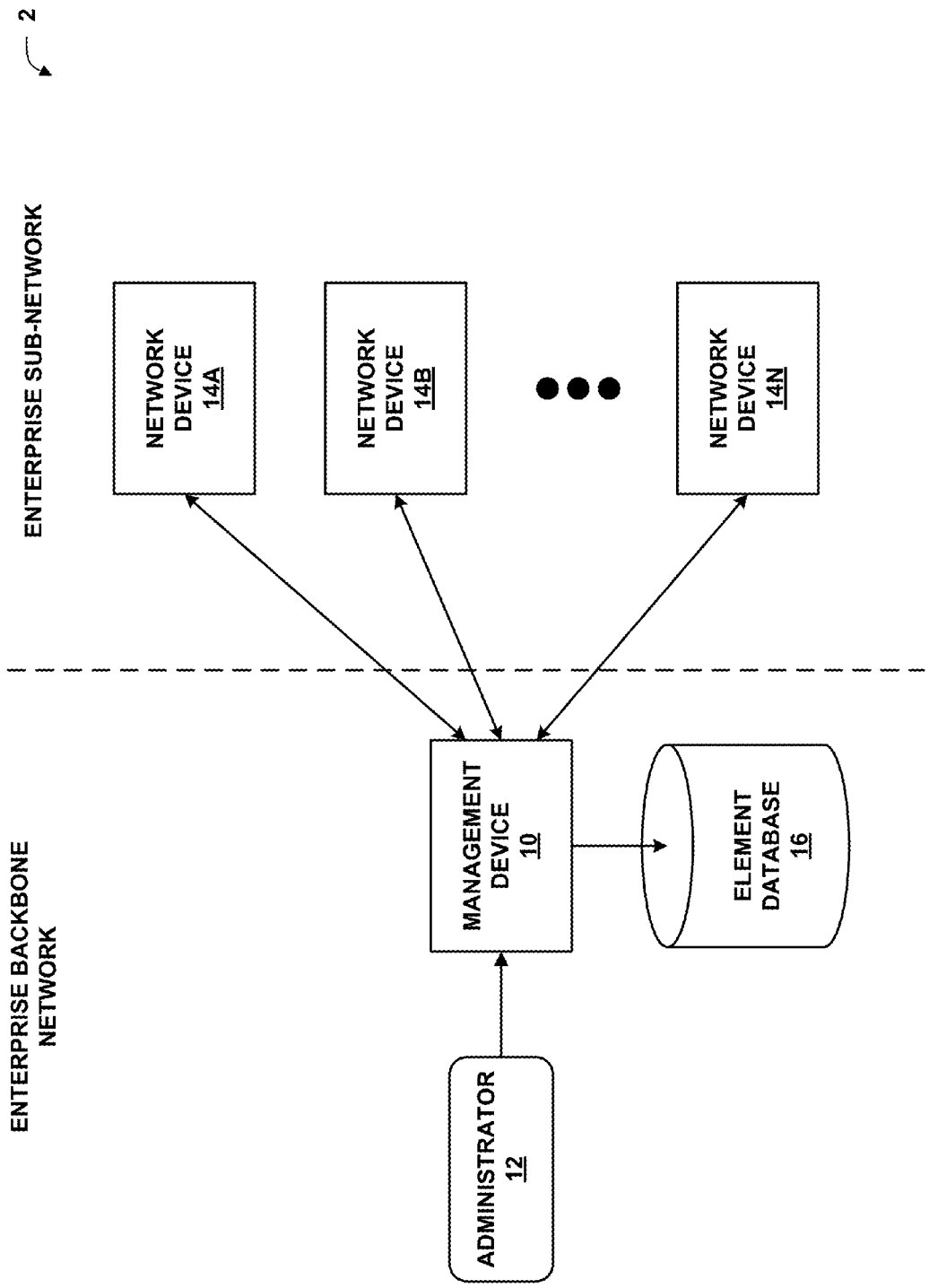
FIG. 1 is a block diagram illustrating an example enterprise for which a plurality of similar network devices are to be configured.

FIG. 1 is a block diagram illustrating an example enterprise 2 for which a plurality of similar network devices 14A-14N (network devices 14) are to be configured. In general, this disclosure describes techniques for mass deployment and activation of similar network devices within an enterprise. For the purposes of this disclosure, network devices are considered "similar" when, for example, each of the network devices are of a common manufacturer's platform and operating system. In general, when a group of similar network devices are shipped to customers, the devices are typically in configured according to factory defaults. To deploy and manage these devices with a centralized management system (e.g., management device 10 and element database 16), remote users have to configure the network settings and management configurations on each of the boxes.

In the example of FIG. 1, it is assumed for purposes of illustration that network devices 14 are similar and that each of network devices 14 is to receive the same basic configuration to become enabled. Network devices 14 may include, for example, routers, switches, gateways, bridges, hubs, servers, computing devices, computing terminals, printers, or other network devices. It is assumed for the purpose of discussion that each of network devices 14 corresponds to the same type of platform. For example, each of network devices 14 may comprise a router. In some examples, network devices 14 may comprise a plurality of different platforms that receive similar network configurations, e.g., network device 14A may comprise a router, network device 14B may comprise a switch, network device 14C may comprise an IDP device, etc. However, it is assumed for the purposes of discussion below that each of network devices 14 corresponds to the same type of platform. Enterprise 2 or another networked entity may deploy network devices 14 in order to expand to a new location, open a new outlet, add a new division, upgrade an existing outlet, location, or division to newer network devices, or otherwise expand or upgrade the network associated with enterprise 2. In some examples, the sub-network may include additional network devices that are not similar to network devices 14. In some examples, the sub-network may include a plurality of different types of network devices, where network devices of the same type are similar.

Enterprise 2, in the example of FIG. 1, includes a primary network and a sub-network, as shown. Enterprises may include a plurality of sub-networks, each corresponding to, for example, retail outlets or corporate divisions (e.g., legal, engineering, marketing, sales, accounting, etc.). Enterprise 2 may include additional sub-networks that are not shown in FIG. 1. The enterprise sub-network depicted in FIG. 1 may correspond to a new sub-network for which new network devices 14 are to be enabled. The primary network of enterprise 2 includes a management device 10 that maintains an element database 16 which maintains an object for each network element (e.g., router, switch, gateway, VPN appliance, firewall, and the like) within enterprise 2 that is managed by device 10.

Management device 10 is communicatively coupled to network devices of enterprise 2, including network devices 14 and other network devices of other sub-networks. Once network devices 14 are deployed and activated, management device 10 may manage the network devices using a communications protocol, such as the simple network management protocol (SNMP). The managed network devices are also referred to herein as network "elements." In common practice, management device 10 and network devices managed by management device 10 are centrally maintained by an IT group of the enterprise and are collective referred to as an element management system (EMS) or a network management system (NMS). Administrator 12 interacts with management device 10 to remotely monitor and configure network devices 14. For example, administrator 12 may receive alerts from management device 10 regarding the network devices, view configurations or management data of the network devices, modify the configurations or management data of the network devices, add new network devices to enterprise 2, remove existing network devices from enterprise 2, or otherwise manipulate the network and network devices.

Management device 10 stores data regarding the network and various sub-networks of enterprise 2 in element database 16. In accordance with the techniques of this disclosure, management device 10 stores a bulk configlet for a group of similar network devices 14 in element database 16. In general, a bulk configlet is a configlet that management device 10 generates for a plurality of similar network devices, such as network devices 14. Each of network devices 14 receives the bulk configlet to become enabled, connect to management device 10, and retrieve a specific configuration, such as a specific configlet. That is, each of network devices 14 are initially configured using the same bulk configlet, then receive specific configuration data, e.g., the specific configlet, from management device 10.

A configlet, as referred to in this disclosure, generally comprises a minimal set of data from which a device may extract sufficient configuration details to initialize a network stack and to become active and connected to another network device, such as management device 10. As a result of enabling network connectivity, the configlet may be referred to as a "network" configlet. In general, configlets include an identifier for the configlet (a bulk identifier for a bulk configlet or a specific identifier for configlets specific to a network device, e.g., one of network devices 14), configuration data to enable creation of the network stack by the device executing the configlet, an Internet protocol (IP) address, a domain name or hostname, an IP address of a management device to connect to, a port number for the management device, an identification of one or more communication protocols (such as, for example, the point-to-point protocol (PPP), PPP over Ethernet (PPPoE), or PPP over asynchronous transfer mode protocol (PPPoA)) to use to connect to the management device, and descriptive information of the platform for which the configlet is intended (e.g., platform type, operating system type, and operating system version number). In one example, a configlet may comprise an extensible markup language (XML) file that defines configuration data for a network device.

The bulk configlet may be encrypted or encoded using, for example, the data encryption standard (DES), triple DES, the advanced encryption standard (AES), the RSA algorithm created by Rivest, Shamir, and Adleman, information concealment engine (ICE), the international data encryption algorithm (IDEA), or other public/private key encryption algorithms, symmetric key encryption algorithms, or block encryption algorithms. The bulk configlet may require a password to be accessible, which may comprise a default password or a password set by administrator 12. In this manner, administrator 12 may prevent unauthorized access to a network of enterprise 2 by a device or entity that may gain access to the bulk configlet. In addition, the bulk configlet may include a username and password for gaining authorized access to management device 10. Thus, two distinct passwords may be associated with a bulk configlet: a password to decrypt an encrypted bulk configlet, and a password used by the configlet to initiate a network session with management device 10.

In one example, management device 10 maintains element database 16 to model each network device currently deployed within the enterprise. Management device may present topographical views of the devices within the enterprise network and allow administrator 12 to select any of the devices for interrogation or configuration. When mass deploying network devices 14, administrator 12 interacts with management device 10 to define a single model (e.g., a group object) for network devices 14, and associates the model with a bulk configlet. Administrator 12 additionally specifies the particular number of network devices 14 to be deployed. When administrator 12 specifies a number of network devices 14 to be deployed, management device 10 interacts with element database 16 to automatically create from the group object a number of individual device objects of the type for network devices 14, where the number of device objects corresponds to the number of devices specified by administrator 12. In an alternative example, management device 10 dynamically produces device objects when a new one of network devices 14 connects to management device 10 using the bulk configlet. Each of the device objects is referred to in this disclosure as a managed element, which generally comprises a representation of a device. Management device 10 stores device objects for each of the managed elements in element database 16. Management device 10 may also store an identifier to indicate whether the managed element is currently free or has been assigned to a physical device. Management device 10 may additionally store a pointer to a next "free" or "available" managed element, e.g., a next managed element for which the identifier indicates that the managed element has not been assigned to a network device.

Management device 10 differentiates the bulk configlet from other configlets by, in one example, appending "bulk" to the identifier of the bulk configlet. In general, the bulk configlet for network devices 14 includes a set of configuration data that will enable each of network devices 14 to configure a network stack and to connect to management device 10. The bulk configlet also includes a bulk identifier that is used by the network device in its initial communications with management device 10 to specify the group with which the device being activated is to be associated and to trigger the management device into processing the communication as part of a mass deployment. When one of network devices 14, e.g., network device 14A, connects to management device 10, network device 14A sends the bulk identifier to management device 10. When management device 10 sends a set of specific configuration data to network device 14A, network device 14A will use an identifier specified in the specific configuration during network sessions with management device 10. In this manner, management device 10 recognizes when one of network devices 14 connects using the bulk configlet as opposed to one of network devices 14 connecting to management device 10 using a specific configuration.

Management device 10 stores the bulk configlet to a computer-readable medium that can be sent to the physical location(s) of network devices 14. In one example, management device 10 stores the bulk configlet to a flash drive (including a flash drive commonly referred to as a "thumb" or "pen" drive), CD-ROM, disk, or other magnetic, solid state, or optical media. Because network devices 14 use the bulk configlet to become enabled and network operable, management device 10 generally will not transmit the bulk configlet to the one of network devices 14 that is to use the bulk configlet. However, in one example, management device 10 transmits the bulk configlet to another device that has already been enabled and that is located in relatively close physical proximity to the one of network devices 14 that is to be enabled. The device that receives the bulk configlet may, for example, comprise a laptop computer, a personal computer, a personal digital assistant (PDA), a cellular or so-called "smart" phone, or other computing device capable of receiving, storing, and then loading the bulk configlet. This device then stores the bulk configlet to a computer-readable medium for the one of network devices 14 to be enabled.

As an example, a user configures network device 14A with the bulk configlet. For example, the bulk configlet may be loaded on flash memory of a pen or "thumb" drive. Each of network devices 14 are configured to check for the presence of a bulk configlet on a pen drive when each of network devices 14 is booted. Therefore, in this example, the user connects the pen drive containing the bulk configlet to network device 14A and starts network device 14A. Network device 14A then begins by checking for the presence of the bulk configlet, which should be found, causing network device 14A to load the bulk configlet and connect to management device 10.

In order to establish a connection with management device 10, the connecting one of network devices 14 needs to be configured with a hostname. In one example, administrator 12 sends a physical or electronic pamphlet to the physical location of network devices 14 along with the pen drive or other computer-readable medium encoded with the bulk configlet. The pamphlet includes instructions for a local administrator or other person that effectively states, "When prompted for hostname, enter _____," and administrator 12 fills in the blank with the proper hostname. For example, a reference sheet includes a list of instructions in the form, "When prompted for information [x], type [y]." Thus the prompt may request, "Please enter hostname:" and the instructions on the form may state, "When prompted for hostname, enter branchXNetwork." In another example, management device 10 maintains a mapping of device serial numbers to a specific hostname. When a device connects to management device 10, management device 10 receives the serial number of the device, identifies the corresponding hostname, and configures the device with the appropriate hostname based on the serial number.

When one of network devices 14 connects to management device 10 as a result of executing the bulk configlet, management device 10 selects one of the created objects of the network model within the element database 16 to be allocated to the connecting network device, and pushes configuration data specific to that one of network devices 14. The bulk configlet includes the bulk identifier that identifies the one of network devices 14 as a device executing the bulk configlet. Management device 10 therefore determines that the one of network devices 14 needs to be configured. Management device 10 sends specific configuration data, including a unique identifier, to the one of network devices 14. Management device 10 determines the configuration data to send to the one of network devices 14 based on the identifier of the bulk configlet, which identifies a type corresponding to the one of network devices 14.

Management device 10 retrieves data for the selected object within the element database 16, such as a unique identifier as specified within the allocated device object, and sends the retrieved data as well as any additional configuration data to fully enable the network device. That is, as explained above, for bulk activation management device 10 is pre-configured with a group object and a number of associated configuration objects equivalent to the number of network devices 14 that need to be configured. For example, management device 10 retrieves a previously generated device object for the network device from element database 16 and sends configuration data corresponding to the device object to the network device. In this example, management device 10 stores a pointer to a "next available" device object in element database 16, and when a new network device connects to management device 10 using the bulk configlet, management device 10 retrieves the next available device object for the device type corresponding to the bulk configlet identifier, forwards configuration data for that device object to the network device, and update the pointer to point to an available device object of the type for the bulk configlet identifier. In another example, management device 10 dynamically generates a new device object for the new network device that has connected using the bulk configlet.

Rather than require an administrator to map managed elements of a managed element system to physical devices, the techniques of this disclosure enable management device 10 to dynamically assign managed elements to each of network devices 14 as network devices 14 are deployed and are booted. That is, management device 10 dynamically assigns a device object to each of network devices 14 as each of network devices 14 initially connects to management device 10, in one example. In this manner, administrator 12 need not know specifically which of network devices 14 maps to each device object in order to configure network devices 14.

In one example, the bulk configlet comprises an XML file and administrator 12 models network devices 14 according to an XML schema. Administrator 12 may create the XML schema or receive the XML schema from a manufacturer or distributor of network devices 14. In general, an XML schema describes the structure of an XML document. The XML schema describes one or more various elements as being required to be filled in, optional, fixed, or default (which may be overridden), attributes of the XML document, relationships between elements (e.g., parent/child relationships between elements and ordering of child elements), data types for elements, or other information regarding the ultimate XML file. In some examples, management device 10 is configured to perform a validation procedure on the bulk configlet according to the XML schema. XML schemas and corresponding validation procedures are described in greater detail by W3C, XML Schema Part 0: Primer (Oct. 28, 2004, Second Edition, editors David C. Fallside and Priscilla Walmsley); W3C, XML Schema Part 1: Structures Second Edition (Oct. 28, 2004, Second Edition, editors Henry S. Thompson et al.); and W3C, XML Schema Part 2: Datatypes (Oct. 28, 2004, Second Edition, editors Paul V. Biron and Ashok Malhotra), which are each incorporated by reference herein in their respective entireties.

In some examples, management device 10 provides a device management interface (DMI) for administrator 12 to manage network devices 14 once network devices 14 have received specific configurations. The DMI may comprise an interface, such as a graphical user interface (GUI) or command line interface by which administrator 12 dynamically adjusts configuration data for one or more of network devices 14 or other devices managed by management device 10.

The techniques of this disclosure may simplify the task of deploying and enabling a large number of similar devices. This may be especially true when a manager or other user tasked with the responsibility to deploy and enable the devices is not technically savvy, when the devices are deployed in remote locations from each other, and when users of the device are not aware of necessary management configurations to be managed by management device 10. Moreover, the techniques of this disclosure may simplify the task of applying similar configurations to each of the newly deployed devices and identifying which managed element in a management system corresponds to each physical device. In accordance with the techniques of this disclosure, administrator 12 need only create one bulk configlet for network devices 14, rather than individual configlets for each of network devices 14.

Figure 2:
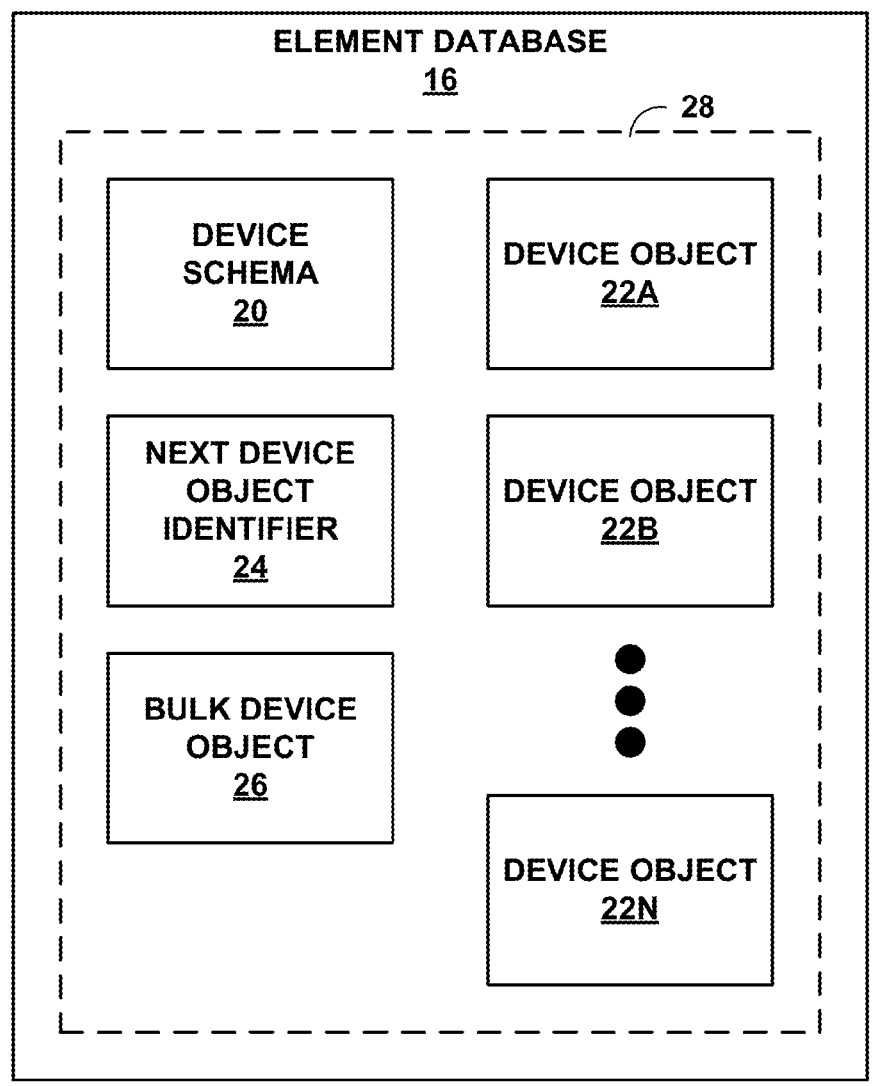
FIG. 2 is a block diagram illustrating an example dataset stored by an element database of FIG. 1.

FIG. 2 is a block diagram illustrating an example dataset 28 stored by element database 16 of FIG. 1. Dataset 28 generally corresponds to a set of data for one type of device to be configured by a common bulk configlet. Element database 16 stores a plurality of datasets similar to dataset 28, each corresponding to a different set of similar devices, depending upon the number of sets of similar devices stored in element database 16. In the example of FIG. 2, dataset 28 represents data stored by element database 16 that corresponds to network devices 14 (FIG. 1).

In the example of FIG. 2, dataset 28 includes an identifier (e.g., filename or uniform resource locator (URL)) of a device schema 20 for the dataset, a device objects 22A-22N (device objects 22), a next device object identifier 24, and a bulk device object 26. Each of device objects 22 corresponds to one of network devices 14 (FIG. 1). Device objects 22 each generally include information that describes a respective one of network devices 14. For example, device objects 22 include information defining a specific device name, IP address, and/or port number. In some examples, each of device objects 22 also store a serial number for the respective one of network devices 14. In some examples, management device 10 implements DHCP to assign an IP address to each one of network devices 14 as each of these network devices 14 are configured using the bulk configlet. Management device 10 then records the IP addresses in the respective one of device objects 22. In some examples, management device 10 allocates an IP address to each device object 22 before device objects 22 are associated with network devices 14 without using DHCP.

In some examples, management device 10 receives a predetermined number of network devices 14 that are to be deployed and create a corresponding number of device objects 22 in element database 16. Alternatively, management device 10 may dynamically allocate device objects 22 as a new one of network devices 14 connects to management device 10. Management device 10 may also create a certain number of device objects 22 initially, then dynamically create new device objects 22 when a number of network devices 14 connects to management device 10 in excess of the previously created device objects 22. Each of device objects 22 stores a device name for the respective one of network devices 14, which management device 10 assigns when device objects 22 are created. Thus device objects 22 store device names before the device names are assigned to particular ones of network devices 14.

When one of network devices 14, e.g., network device 14A, connects to management device 10 using the bulk configlet, network device 14A passes the bulk configlet identifier to management device 10. Management device 10 recognizes the bulk configlet identifier by comparing the identifier to the identifier stored in bulk device object 26. When the received identifier matches the identifier of bulk device object 26, management device 10 determines that network device 14A is connecting using the bulk configlet. Management device 10 then assigns network device 14A to the next available one of device objects 22. Management device 10 also forwards specific configuration data from the one of device objects 22 to the corresponding one of network devices 14. The specific configuration data includes, for example, a device name and an IP address. The one of network devices 14 then stores the received configuration data and uses the configuration data to reconnect to management device 10 during subsequent network communication sessions.

Management device 10 locates a next available one of device objects 22 using next device object identifier 24, which may be a counter maintained within the database or a pointer to a data structure of objects. When management device 10 pre-allocates device objects 22, management device 10 sets the value of next device object identifier 24 to a first one of device objects 22, e.g., device object 24A. When one of device objects 22 is assigned to one of network devices 14, management device 10 updates the value of next device object identifier 24 to refer to an entry corresponding to a different one of device objects 22 that has not yet been allocated to one of network devices 14. Therefore, when one of network devices 14 connects to management device 10 using the bulk configlet, management device 10 assigns the one of device objects 22 identified by next device object identifier 24 to the one of network devices 14 and updates the value of next device object identifier 24.

In the example of FIG. 2, dataset 28 also includes a device schema identifier 20. Device schema identifier 20 may be a filename of an XML schema for the particular bulk configlet that defines a minimal set of elements for the bulk configlet, parameters for each element of the bulk configlet, such as whether an element is required or optional, a minimum number of occurrences of the element, a maximum number of occurrences of the element, default values for the element, or other data. Management device 10 may receive device schema 20 from a manufacturer of network devices 14. Alternatively, administrator 12 or another user may create device schema 20 using a suitable editor. Administrator 12 may refer to device schema 20 during creation of the bulk configlet. In some examples, management device 10 also performs a verification procedure on the bulk configlet to verify that the bulk configlet satisfies the requirements of device schema 20. Although device schema 20 may define a particular number of elements and/or requirements for those elements, administrator 12 may create a bulk configlet that includes additional elements, so long as the additional elements do not conflict with the defined requirements of device schema 20. Likewise, when device schema 20 defines default values for a particular element, administrator 12 may override those default values.

Bulk device object 26 generally includes configuration data similar to device objects 22, such as the IP address of management device 10. However, rather than storing an identifier specific to one of network devices 14, bulk device object 26 stores the bulk identifier assigned to the bulk configlet. Other data of bulk device object 26 may generally correspond to device objects 22, such as, for example, a protocol by which network devices 14 and management device 10 communicate (e.g., PPP, PPPoE, or PPPoA), a hostname for network devices 14, or other configuration data that is common to network devices 14. In some examples, bulk device object 26 stores the next device object identifier 24 as an entry thereof, rather than next device object identifier 24 being a separate data entry in element database 16. Administrator 12 activates bulk device object 26 in order to create the bulk configlet, in some examples. In some examples, bulk device object 26 includes a flag that indicates that the bulk device object 26 is marked for bulk activation.

Figure 3:
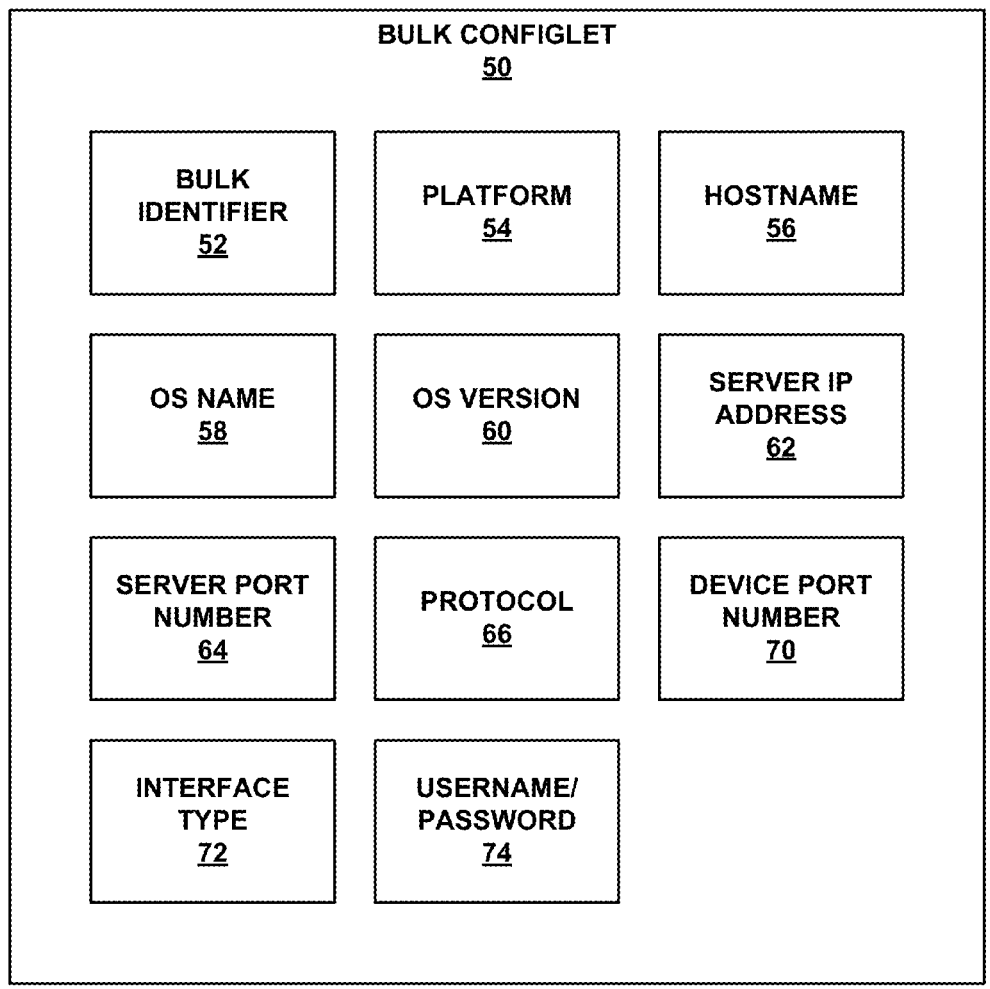
FIG. 3 is a block diagram illustrating data stored by an example bulk configlet.

FIG. 3 is a block diagram illustrating data stored by an example bulk configlet 50. Bulk configlet 50 may be implemented in XML, as described in the pseudocode below. Bulk configlet 50 comprises elements described by device schema 20 (FIG. 2). Management device 10 generates bulk configlet 50 in response to data received from administrator 12 (FIG. 1). Management device 10 may further execute a verification procedure on bulk configlet 50 against device schema 20. Each of network devices 14 initially use bulk configlet 50 to connect to management device 10 in order to become configured. That is, each of network devices 14 uses the same configuration data initially to become configured and to receive a set of specific configuration data. Management device 10 stores bulk configlet 50 to a transportable computer-readable storage medium, such as a CD-ROM, flash drive (e.g., a thumb or pen drive), disk, or other computer-readable storage medium. Each of network devices 14 are configured to check for the presence of the bulk configlet on the computer-readable storage medium during boot-up. When one of network devices 14 detects the bulk configlet, the one of network devices 14 bootstraps itself using data of bulk configlet 50. The following discussion describes network device 14A for purposes of explanation, however, each of network devices 14 utilize bulk configlet 50 in a similar manner to that described with respect to network device 14A.

Bulk configlet 50 includes bulk identifier 52. When network device 14A boots using bulk configlet 50, network device 14A identifies itself to management device 10 using bulk identifier 52. In this manner, management device 10 recognizes that network device 14A requires specific configuration data. Therefore, management device 10 sends, and network device 14A receives specific configuration data after network device 14A connects to management device 10 and sends bulk identifier 52. The specific configuration data sent from management device 10 to network device 14A includes a specific device name.

Bulk configlet 50 also includes information specific to bulk configlet 50, such as platform 54, hostname 56, operating system (OS) name 58, and OS version 60. In some examples, when network device 14A detects the presence of bulk configlet 50 during boot-up, network device 14A verifies that these values match corresponding values stored by network device 14A. In this manner, network device 14A may avoid booting from a bulk configlet that was not configured for device types such as network device 14A. For example, a user may inadvertently connect an improper bulk configlet to network device 14A. By verifying that the data of bulk configlet 50 matches that of network device 14A, network device 14A may avoid receiving an improper configuration from management device 10 as a result of inadvertent user error. For example, by verifying platform 54, network device 14A may avoid being configured as if network device 14A were a server when in fact network device 14A comprises a router.

Bulk configlet 50 includes server address 52, server port number 64, and protocol 66. Network device 14A may include an implementation of protocol 66 natively, or may receive executable instructions from bulk configlet 50 that correspond to protocol 66. Protocol 66 may comprise, for example, point to point protocol (PPP), PPP over Ethernet (PPPoE), PPP over asynchronous transfer mode (PPPoA), or other protocols. Network device 14A connects to management device 10 using the protocol identified by protocol 66 at the IP address of server IP address 52 on the port number indicated by server port number 64. Likewise, network device 14A utilizes device port number 70 to initially connect to management device 10. Network device 14A receives configuration data from management device 10 including an IP address and, potentially, a different port number, to use as the device IP address and port number, respectively, for future communication sessions.

Bulk configlet 50 also includes interface type 72 to identify and/or configure a network interface of network device 14A. The network interface may comprise, for example, an Ethernet interface, a gigabit Ethernet interface, a wireless network interface, a cable modem, a telephone modem, an asymmetric digital subscriber line (ADSL), Serial, T1/E1, or other network interface.

In the example of FIG. 3, bulk configlet 50 includes username/password 74. Network device 14A uses username/password 74 to authenticate itself to management device 10. In other examples, bulk configlet 50 is encrypted and does not include username/password 74. Thus a bulk configlet may be encrypted to prevent unauthorized access to the data of the bulk configlet, and may further include a password to prevent unauthorized access to management device 10. However, other examples may exclude either or both of username/password 74 and encryption of the bulk configlet. Likewise, other examples may include neither username/password 74 nor encryption of the bulk configlet.

The following XML code is one example of a configlet schema, e.g., device schema 20. In one example, administrator 12 uses this example configlet schema to validate a bulk configlet. In another example, e.g., as described with respect to FIG. 15 below, a device manufacturer validates the bulk configlet created by administrator 12 using the configlet schema below. In the code segment, "minOccurs="0"" in the line "<xs:element name="ask-information" type="ask-info" minOccurs="0"/>" indicates that the step is optional. The type label "ask-info" indicates that the configlet will cause the network device to request this data from a user. When this information is filled in for an instantiated configlet, the device being configured will prompt the user for the indicated information of this type. Administrator 12 configures the bulk identifier to use this type of prompt to retrieve a hostname from the user of the network device being configured. Therefore, in some examples, the device prompts a user for a hostname when this information is filled in. In this manner, the configlet causes the device to prompt the user for certain information during initialization and configuration of the device.

```xml
<?xml version="1.0" encoding="UTF-8" ?>
<!-- Copyright (c) 2009, Juniper Networks, Inc. -->
<!-- All rights reserved -->
<xs:schema xmlns:xs="http://www.w3.org/2001/XMLSchema"
version="1.0">
    <xs:element name="configlet">
        <xs:complexType>
            <xs:sequence>
                <!-- configlet header information -->
                <xs:element name="header" type="header"/>
                <!-- configuration information -->
                <xs:element name="data" type="xs:anyType"/>
            </xs:sequence>
        </xs:complexType>
    </xs:element>
    <!-- headertype -->
    <xs:complexType name="header">
        <xs:sequence>
            <!-- This node if exists may contain information to ask the user -->
            <xs:element name="ask-information" type="ask-info"
                minOccurs="0"/>
            <!-- This node if exists may contain information to be validated
            by the device -->
            <xs:element name="validation-information" type="validation-info"
                minOccurs="0"/>
        </xs:sequence>
    </xs:complexType>
    <xs:complexType name="ask-info">
        <xs:sequence>
            <!-- allows user to enter host-name for bulk configlets -->
            <xs:element name="host-name" minOccurs="0">
                <complexType/><!-- empty element -->
            </xs:element>
        </xs:sequence>
    </xs:complexType>
    <xs:complexType name="validation-info">
        <xs:sequence>
            <!-- auto validation by device - optional -->
            <xs:element name="auto" type="auto-validation"
                minOccurs="0"/>
        </xs:sequence>
    </xs:complexType>
    <xs:complexType name="auto-validation">
        <xs:sequence>
            <!-- serial number is an exact match and optional -->
            <xs:element name="serial-number" type="xs:string"
                minOccurs="0"/>
            <!-- os version is regex match and optional -->
            <xs:element name="os-version" type="xs:string"
                minOccurs="0"/>
            <!-- os name is regex match and optional -->
            <xs:element name="os-name" type="xs:string" minOccurs="0"/>
            <!-- platform is regex match and optional -->
            <xs:element name="platform" type="xs:string" minOccurs="0"/>
        </xs:sequence>
    </xs:complexType>
</xs:schema>
```

The following code segment is one example of an instantiated bulk configlet according to the above configlet schema. In the following example, the device is configured to connect to a server at address "2.2.2.2" on port 80. The device is also configured to use a gigabit Ethernet interface using address 1.1.1.1/24. Because the field "ask-information" is filled in with "host-name," the device will prompt a user for the host-name information, in accordance with the configlet schema presented above. The following code segment generally defines a configlet that is used as a bulk configlet that prompts a user for the host-name, defines an Ethernet interface, and receives a static IP address.

```xml
<?xml version="1.0" ?>
<configlet xmlns="http://xml.juniper.net/dmi/configlet_v1"
    xmlns:xsi="http://www.w3.org/2001/XMLSchema-instance"
    xsi:schemaLocation="http://xml.juniper.net/dmi/configlet_v1
    http://xml.juniper.net/dmi/configlet_v1.xsd">
    <header>
        <ask-information>
            <host-name/>
        </ask-information>
        <validation-information>
            <auto>
                <os-version>9.6R2</os-version>
                <platform>srx210</platform>
            </auto>
        </validation-information>
    </header>
    <data>
        <configuration>
            <system>
                <services>
                    <outbound-ssh>
                        <client>
                            <name>c1</name>
                            <device-id>1</device-id>
                            <services>netconf</services>
                            <servers>
                                <name>2.2.2.2</name>
                                <port>80</port>
                            </servers>
                        </client>
                    </outbound-ssh>
                </services>
            </system>
            <interfaces>
                <interface>
                    <name>ge-0/0/3</name>
                    <unit>
                        <name>0</name>
                        <family>
                            <inet>
                                <address>
                                    <name>1.1.1.1/24</name>
                                </address>
                            </inet>
                        </family>
                    </unit>
                </interface>
            </interfaces>
        </configuration>
    </data>
</configlet>
```

The following code segment is another example configlet that is device specific, in accordance with the above configlet specification. That is, the following code segment is an example implementation of a device-specific configlet. In this example, the server device validates a serial number for the device being configured. The hostname specified for this device is "chewbacca." The device being configured uses an Ethernet interface and is configured to use DHCP to acquire an IP address.

```xml
<?xml version="1.0" ?>
<configlet xmlns="http://xml.juniper.net/dmi/configlet_v1"
    xmlns:xsi="http://www.w3.org/2001/XMLSchema-instance"
    xsi:schemaLocation="http://xml.juniper.net/dmi/configlet_v1
    http://xml.juniper.net/dmi/configlet_v1.xsd">
    <header>
        <validation-information>
            <auto>
                <serial-number>12345</serial-number>
                <os-version>9.6R1</os-version>
                <platform>srx210</platform>
            </auto>
        </validation-information>
    </header>
```

```
<data>
    <configuration>
        <system>
            <host-name>chewbacca</host-name>
            <services>
                <outbound-ssh>
                    <client>
                        <name>c1</name>
                        <device-id>1</device-id>
                        <services>netconf</services>
                        <servers>
                            <name>2.2.2.2</name>
                            <port>80</port>
                        </servers>
                    </client>
                </outbound-ssh>
            </services>
        </system>
        <interfaces>
            <interface>
                <name>ge-0/0/3</name>
                <unit>
                    <name>0</name>
                    <family>
                        <inet>
                            <dhcp/>
                        </inet>
                    </family>
                </unit>
            </interface>
        </interfaces>
    </configuration>
</data>
</configlet>
```

The following code segment presents another example instantiation of a bulk configlet according to the above configlet schema. In this example, the bulk configlet is configured to use a PPPoE interface.

```
<?xml version="1.0" ?>
<configlet xmlns="http://xml.juniper.net/dmi/configlet_v1"
    xmlns:xsi="http://www.w3.org/2001/XMLSchema-instance"
    xsi:schemaLocation="http://xml.juniper.net/dmi/configlet_v1
    http://xml.juniper.net/dmi/configlet_v1.xsd">
    <header>
        <validation-information>
            <auto>
                <os-version>9.6R2</os-version>
                <platform>srx210</platform>
            </auto>
        </validation-information>
    </header>
    <data>
        <configuration>
            <system>
                <services>
                    <outbound-ssh>
                        <client>
                            <name>c1</name>
                            <device-id>1</device-id>
                            <services>netconf</services>
                            <servers>
                                <name>2.2.2.2</name>
                                <port>80</port>
                            </servers>
                        </client>
                    </outbound-ssh>
                </services>
            </system>
            <access>
                <profile>
                    <name>ppprof1</name>
                    <client>
                        <name>root</name>
                        <chap-secret>$9$7H-
                        VsHkPTQns2fTz6uOWLx7VYoJD</chap-secret>
                    </client>
                </profile>
            </access>
            <interfaces>
                <interface>
                    <name>pp0</name>
                    <unit>
                        <name>0</name>
                        <ppp-options>
                            <chap>
                                <access-profile>ppprof1</access-profile>
                                <passive!>
                            </chap>
                        </ppp-options>
                    </unit>
                </interface>
            </interfaces>
        </configuration>
    </data>
</configlet>
```

The following is an example portion of a configlet schema, e.g., device schema 20. The example code provides an example in which an element of the configlet is mandatory. In the example code, the mandatory element is an outbound-ssh-client. The element is made mandatory by declaring that "min-occurs" is 1.

```
<xsd:element name="client" minOccurs="0" maxOccurs="unbounded">
    <xsd:annotation>
        <xsd:documentation>Define a device initiated SSH
            connection</xsd:documentation>
        <xsd:appinfo>
            ...
            <dmi:element-info>
<configlet>
    <min-occurs>1<min-occurs><<< THIS WILL APPLY SINCE >
    minOccurs
            <<<on element
    <max-occurs>1<max-occurs><<< THIS WILL APPLY SINCE <
    maxOccurs
            <<<on element
</configlet>
            <regex-match>^[[:alnum:]._-]+$</regex-match>
        </dmi:element-info>
    </xsd:appinfo>
```

The following XML code is an example portion of code for defining an optional element of a configlet schema with a maximum number of elements. In the example, there may be zero or one occurrences of the element, but no more than one. The optional element in this example is system/host-name. The element is optional because "min-occurs" is declared to be 0.

```
<xsd:element name="host-name" minOccurs="0">
    <xsd:annotation>
        <xsd:documentation>Hostname for this router</xsd:documentation>
        <xsd:appinfo>
            ...
            <dmi:element-info>
<configlet>
    <min-occurs>0<min-occurs>
    <max-occurs>1<max-occurs>
</configlet>
            <regex-match>^[[:alnum:]._-]+$</regex-match>
        </dmi:element-info>
    </xsd:appinfo>
```

The following XML code is an example portion of code for defining a mandatory element of a configlet schema. The element also includes a maximum number of elements. In this example, the maximum number of elements is five. In this example, the mandatory element corresponds to an interface or multiple interfaces.

```
<xsd:element name="interface" minOccurs="0" maxOccurs="unbounded">
  <xsd:annotation>
    <xsd:documentation>One or more interfaces that belong to interface
      set</xsd:documentation>
    <xsd:appinfo>
      ...
      <dmi:element-info>
        <configlet>
          <min-occurs>1<min-occurs><<< THIS WILL APPLY SINCE >
            minOccurs on element
          <max-occurs>5<max-occurs><<< THIS WILL APPLY SINCE <
            maxOccurs on element
        </configlet>
      </dmi:element-info>
```

The following XML code is an example portion of code for an instantiated configlet element that satisfies the requirements of the defined min/max elements of the schema. This configlet element corresponds to the "interface" element of the configlet schema defined above.

```
<xsd:element name="interface" minOccurs="0" maxOccurs="unbounded">
  <xsd:annotation
    <xsd:documentation>One or more interfaces that belong to interface
      set</xsd:documentation>
    <xsd:appinfo>
      ...
      <dmi:element-info>
        <configlet/>
      </dmi:element-info>
```

The example code segments described above comprise various examples of a device schema, a bulk configlet, and a device-specific configlet. As described in this disclosure, a computing device may perform a validation procedure of a bulk configlet against a device schema (also referred to as a configlet schema) to ensure the configlet is well-formed and conforms to the configlet schema. In this manner, management device 10 may receive a configlet schema and validate a generated bulk configlet against the configlet schema.

Figure 4:
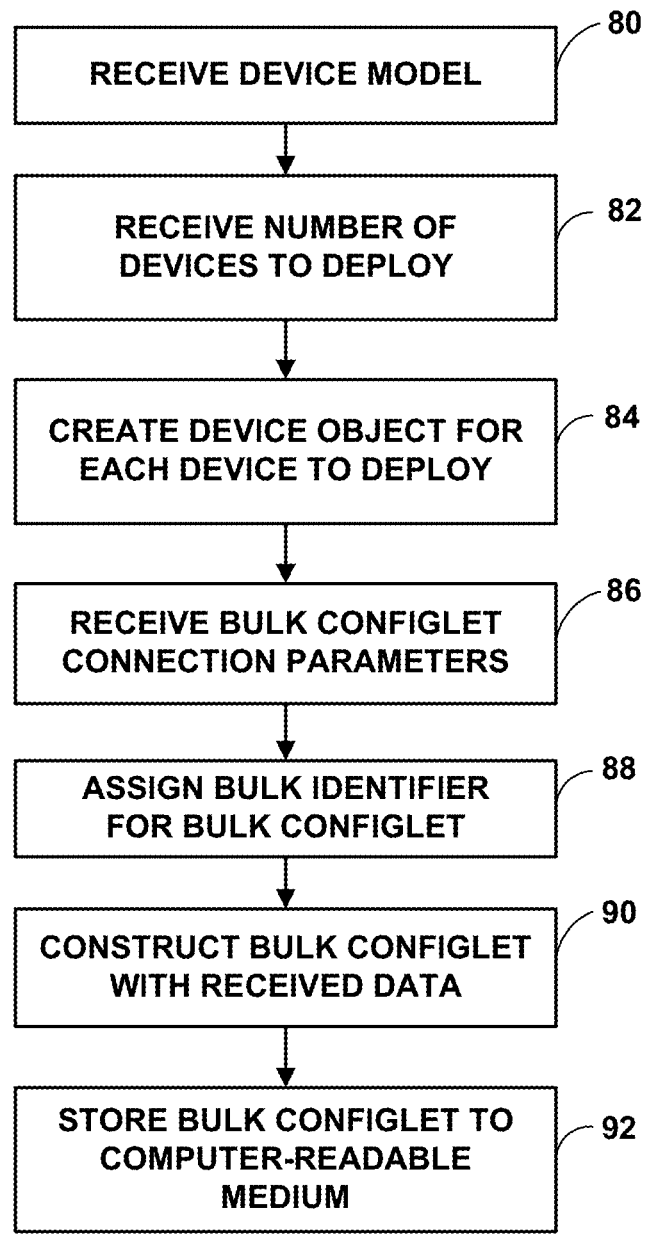
FIG. 4 is a flowchart illustrating an example method for creating a bulk configlet.

FIG. 4 is a flowchart illustrating an example method for creating a bulk configlet. Although generally described with respect to management device 10 (FIG. 1), it should be understood that other management devices may be used to implement similar methods for creating a bulk configlet. The method of FIG. 4 generally includes generating, with a management device, a bulk configlet for a plurality of network devices, wherein the bulk configlet comprises a bulk identifier, encoding the bulk configlet to a computer-readable medium, receiving a network session request from one of the plurality of network devices, wherein the network session request includes the bulk identifier, and sending specific configuration data to the one of the plurality of network devices.

Initially, management device 10 receives model data that specifies elements of a group of similar network devices to be deployed, e.g., network devices 14 (80). Administrator 12 may input this data to management device 10 via, for example, user interface 120 (FIG. 6), or management device 10 may receive the data from another networking device. The model data generally includes data descriptive of the group of network devices 14 such as, for example, a platform type corresponding to network devices 14 and an operating system type and version number for network devices 14. The model data also includes configuration data for a network interface of network devices 14 and an identification of a protocol by which network devices 14 will communicate with management devices 14.

In the example method of FIG. 4, management device 10 receives input specifying number of network devices 14 to deploy (82). Management device 10 creates and stores an equivalent number of device objects 22, plus an additional bulk device object 26, to element database 16 (84). Management device 10 stores elements of the received model data in each of device objects 22 and the bulk device object 26, such as the platform type, operating system type, operating system version, network interface configuration, and communication protocol identifier. In an alternative example, rather than receiving a specific number of network devices and creating device objects 22 a priori, management device 10 creates bulk device object 26 before network devices 14 are deployed and dynamically create each of device objects 22 as each of network devices 14 connects to management device 10.

Management device 10 then receives connection parameters for a bulk configlet to be used to initialize network devices 14 (86). The connection parameters include, for example, a port number for the bulk configlet for use by the network device being activated, as well as an IP address and port number for management device 10 to be used by the network device when establishing the initial connection. The connection parameters may also include instructions for receiving an IP address, e.g., instructions to obtain an address according to DHCP. In one example, the connection parameters also include a username and password that network devices 14 use to authorize themselves to management device 10 when connecting to management device 10 using the bulk configlet. In some examples, the connection parameters additionally include a one-time password that is used only for network sessions initialized by network devices 14 using the bulk configlet. Management device 10 also assigns an identifier for the bulk configlet (88), which management device 10 may create or receive, e.g., from administrator 12.

Management device 10 then creates a bulk configlet, e.g., bulk configlet 50 (FIG. 3) using the received connection parameters and identifier, and the model data used to create the device objects (90). Management device 10 then stores the bulk configlet and, when requested, writes a copy to a computer-readable medium (92), such as a pen drive, CD-ROM, disk, or other flash, optical, or magnetic computer-readable medium, for distribution to a remote facility. In some examples, management device 10 transmits the bulk configlet to a computing device at a remote facility where another user stores the copy of the bulk configlet to a computer-readable medium for use in activating a local network device. In some examples, management device 10 first encrypts the bulk configlet and stores the encrypted bulk configlet to the computer-readable medium. Administrator 12 may ship the computer-readable medium to a user responsible for connecting and initializing network devices 14.

Figure 5:
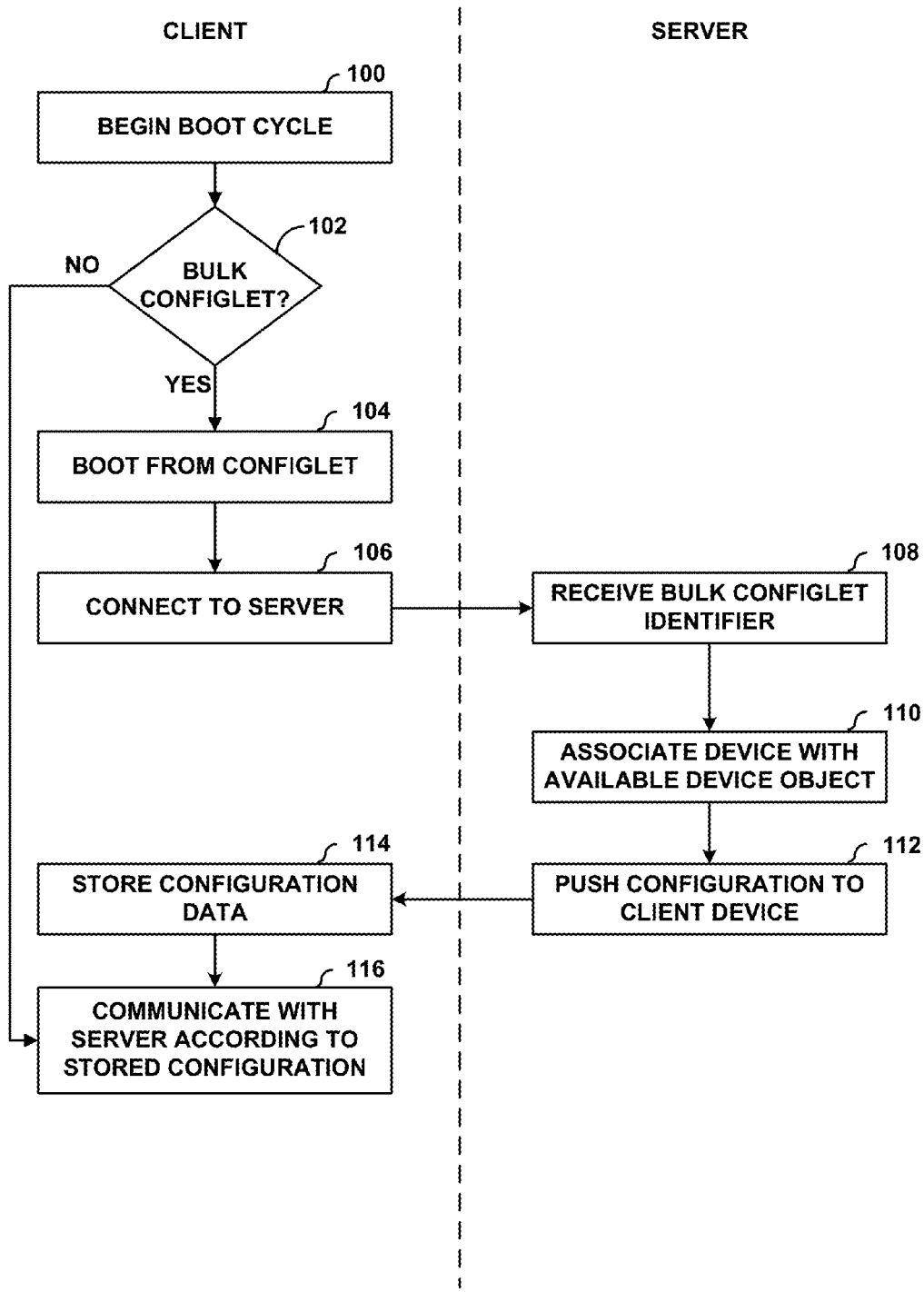
FIG. 5 is a flowchart illustrating an example method for configuring a network device using a bulk configlet.

FIG. 5 is a flowchart illustrating an example method for activating a recently deployed network device, such as network device 14A, using a bulk configlet. Although described with respect to network device 14A (FIG. 1), it should be understood that any of networking devices 14 or other network devices may be configured using a method similar to that discussed with respect to FIG. 5. By executing the example method of FIG. 5, network device 14A performs a method comprising loading, with a network device, a bulk configlet, establishing a network session with a management device using data from the bulk configlet, sending a bulk identifier of the bulk configlet to the management device, and receiving specific configuration data from the management device, wherein the specific configuration data comprises an Internet protocol address and a device name.

Initially, network device 14A begins the boot cycle (100), e.g., when a user first powers on network device 14A. To configure network device 14A, the user connects a pen drive encoded with instructions corresponding to a bulk configlet, such as bulk configlet 50. For example, a store manager may receive the pen drive from administrator 12 along with network device 14A, and receive instructions to insert the pen drive into network device 14A to initially configure network device 14A.

Network device 14A is configured to check, during bootup, whether a bulk configlet is available (102). For example, the basic input/output system (BIOS) configuration manager may be configured to scan a universal serial bus (USB) port to detect the presence of a pen drive and, when a pen drive is detected, whether the pen drive is encoded with instructions corresponding to a bulk configlet. When network device 14A does not detect a pen drive or other computer-readable medium encoded with instructions for a bulk configlet, or when a pen drive is detected but does not include instructions for a bulk configlet ("NO" branch of 102), network device 14A boots from stored configuration data if possible or prompts the user to insert the drive and restart the device (96). For example, when network device 14A has not yet been configured, network device 14A may output an error message, such as, "No configuration detected, please attach pen drive and reboot," or a similar instruction message for the user.

When network device 14A detects a bulk configlet ("YES" branch of 102), network device 14A retrieves data from the bulk configlet in order to boot (104). With respect to example bulk configlet 50 (FIG. 3), network device 14A first performs a diagnostic check to ensure that the bulk configlet can be used to boot network device 14A by verifying that platform 54, OS name 58, and OS version 60 match the platform type and operating system of network device 14A. Network device 14A may also either retrieve hostname 56 directly from bulk configlet 50 or retrieve instructions from the bulk configlet for obtaining the hostname. For example, the bulk configlet may include instructions for prompting a user to enter the hostname. Accordingly, network device 14A may prompt the user for the hostname according to the instructions of the bulk configlet.

Network device 14A also retrieves server data, such as server IP address 62, server port number 64, and protocol 66 from bulk configlet 50. Network device 14A also retrieves device port number 70 and interface type 72 from bulk configlet 50. When bulk configlet 50 includes username/password 74, network device 14A also retrieves username/password 74 from bulk configlet 50. Network device 14A then establishes a network session with management device 10 (106) by connecting to the IP address identified by server IP address 62, on the port identified by server port number 64, using the protocol indicated by protocol 66. Network device 14A opens the port indicated by device port number 70 and obtains an IP address, e.g., via DHCP, to initiate the network session. When establishing the connection, network device 14A sends identifiers of the IP address and device port number 70 to management device 10 in a header of a synchronization (SYN) packet to management device 10. In this manner, network device 14A initiates a communication session with management device 10 using the bulk configlet. After establishing the network connection, network device 14A sends bulk identifier 52 to management device 10.

Upon receiving bulk identifier 52 from network device 14A (108), management device 10 determines that network device 14A is connecting using the bulk configlet. In one example, management device 10 queries element database 16 with the received identifier to identify dataset 28 that corresponds to network device 14A. Management device 10 may further compare the received device identifier to bulk device object 26 to determine that the received identifier is a bulk configlet identifier. Management device 10 determines that the received identifier identifies bulk device object 26, rather than a specific one of device objects 22. Therefore, management device 10 associates network device 14A with a next available one of device objects 22 (110), which management device 10 locates using next device object identifier 24. Management device 10 also updates the value of next device object identifier 24. Alternatively, management device 10 may dynamically allocate a new one of device objects 22 for network device 14A. Management device 10 then sends configuration data specific to network device 14A to network device 14A (112). The specific configuration data management device 10 sends includes a unique device name and IP address to network device 14A. In one example, management device 10 executes an implementation of DHCP to allocate an IP address to network device 14A. In another example, network device 14A obtains an IP address without interacting with management device 10, e.g., from a local gateway device or router using DHCP, rather than from management device 10.

Network device 14A stores the specific configuration data, including the device name and IP address (114). Network device 14A then communicates with management device 10 according to the stored configuration data (116). In this manner, management device 10 is able to manage network device 14A as part of a network management system. Network device 14A may additionally prompt a user to remove the pen drive or other computer-readable medium encoded with the bulk configlet, so that network device 14A does not later attempt to obtain configuration data from management device 10, e.g., upon subsequently restarting, and to indicate that network device 14A has no further need for the bulk configlet. In some examples, network device 14A sets a "configured" flag, which prevents network device 14A from booting from the bulk configlet when network device 14A has already received configuration data.

Figure 6:
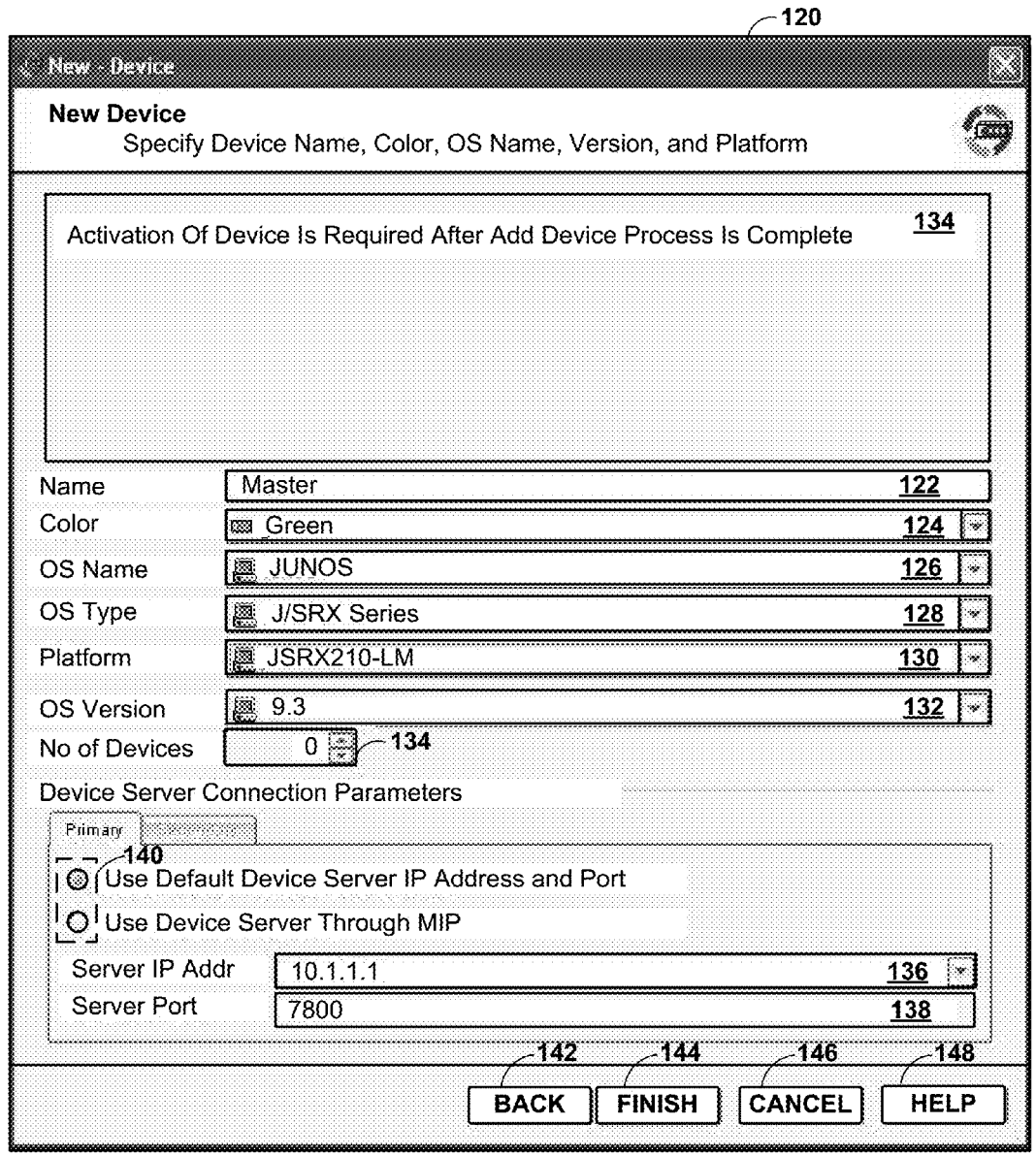
FIGS. 6-12 are screenshots illustrating various user interfaces for receiving data to create and store a bulk configlet in accordance with the techniques of this disclosure.

FIGS. 6-12 are screenshots illustrating various user interfaces presented by management device 10 for receiving data to create and store a bulk configlet in accordance with the techniques of this disclosure. FIG. 6 is a screenshot illustrating an example user interface 120 for developing a bulk configlet for a plurality of devices with similar network configurations. Management device 10 includes a user interface module that cause a display to present user interface 120 when administrator 12 requests to model a new set of network devices with similar configurations. Alternatively, a device separate from management device 10 may receive the data to create a bulk configlet, and network devices 14 may connect to management device 10 using the bulk configlet created by the separate device.

Figure 7:
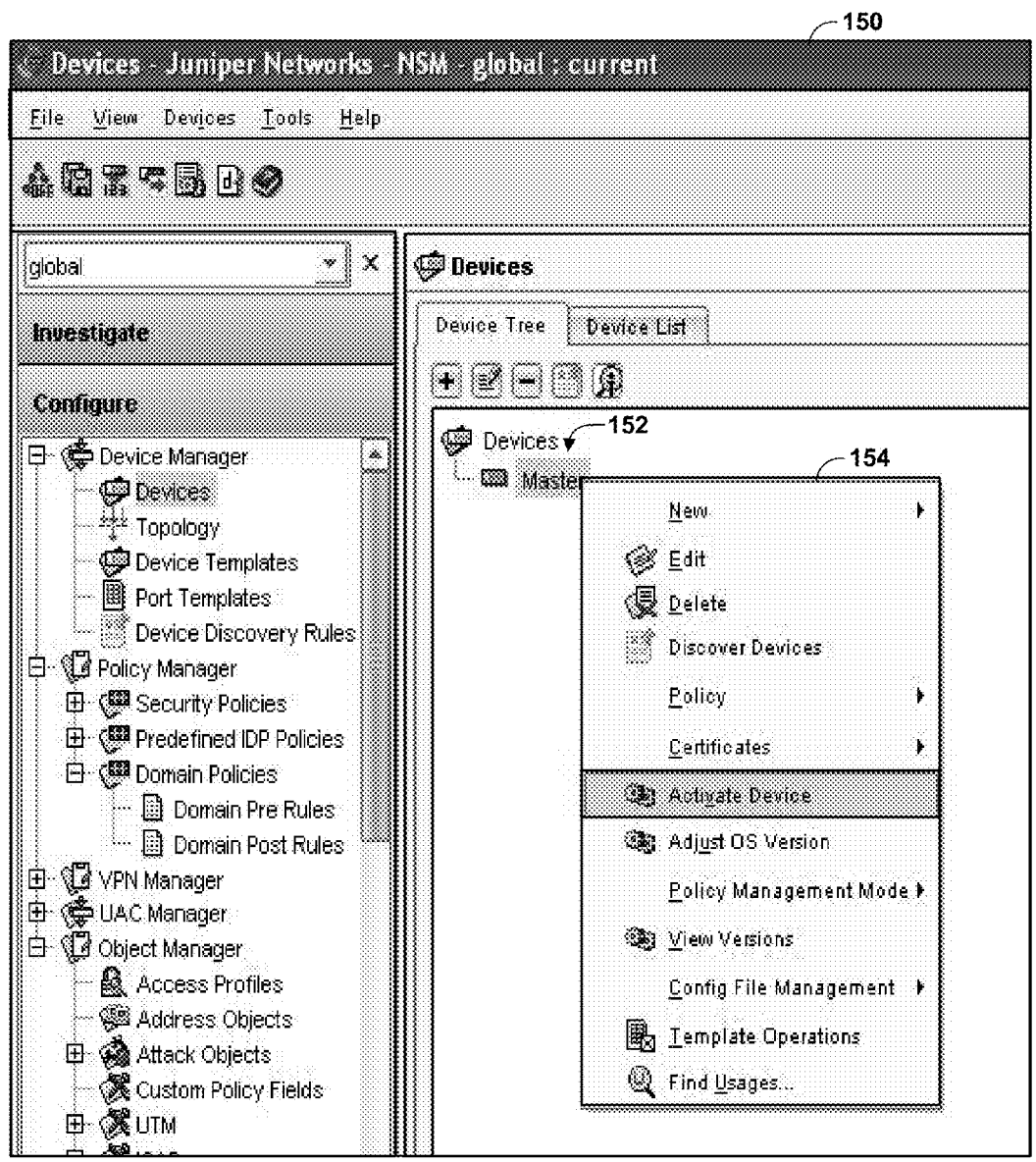

User interface 120 presents name text field 122 to receive a group name for network devices 14 or other group of similar network devices. In the example of FIG. 6, user interface 120 presents color drop-down menu 124 to receive a selection of a color that will be displayed contemporaneously with the name of the network devices, in order to simplify the task of managing network devices of the enterprise for administrator 12, e.g., as shown in FIG. 7. Other examples may use different hatching, shading, outline styles, text coloring, or other visual cues for administrator 12 to differentiate different groups of network devices.

User interface 120 also presents OS name drop-down menu 126, OS type drop-down menu 128, platform drop-down menu 130, and OS version drop-down menu 132. Administrator 12 selects an OS from OS name drop-down menu 126, an OS type from OS type drop-down menu 128, a platform from platform drop-down menu 130, and an OS version number from OS version drop-down menu 132. In the example of FIG. 6, a user has selected "JUNOS" as the OS name, J/SRX Series for the OS type, JSRX210-LM for the platform, and version number 9.3 of the JUNOS J/SRX operating system. User interface 120 may populate OS version drop-down menu 132 only after a user selects an OS name and OS type from OS name drop-down menu 126 and OS type drop-down menu 128, respectively.

User interface 121 presents number box 134 to receive a number specifying to the number of devices to be deployed. For examples in which management device 10 creates a set number of device objects 22, user interface 120 receives the number of devices to be deployed and interacts with element database 16 to create that same number of device objects 22, plus an additional bulk device object 26 to represent the group.

A user selects a method for configuring an IP address for management device 10 by selecting one of radio buttons 140. The top radio button allows a user to select "Use default device server IP address and port." The bottom radio button allows a user to select "Use device server through MIP." MIP (mapped IP) allows the user to select an IP address for management device 10 that does not necessarily correspond to management device 10, e.g., when management device 10 sits behind a gateway or other device and is generally only accessible as part of a private network. That is, an external IP address (accessible to network devices of the Internet generally) may be mapped to management device 10 when management device 10 is assigned an IP address for a private network that is not accessible by the Internet generally but only by other devices of the private network.

In the example of FIG. 6, a user has selected "use default device server IP address and port." Management device 10 responds to this selection by automatically populating server IP address text field 136 and server port number field 138 with the IP address and port number of management device 10. In some examples, administrator 12 may change these default values, e.g., when the ultimate management device to which network devices 14 will connect is different than the device used to create the bulk configlet.

User interface 120 also presents back button 142, finish button 144, cancel button 146, and help button 148. Other user interfaces in the examples of FIGS. 6-12 present these buttons as well. In general, when a user selects back button 142, a previous user interface screen is displayed. Thus the user selects back button 142 to revert to a previous screen to modify entries made on the previous screen. The user selects finish button 144 when the user is finished entering data on a current screen and wishes to progress to a subsequent screen. Cancel button 146 allows a user to cancel creation of a bulk configlet without saving the current bulk configlet. When a user selects help button 148, management device 10 presents additional information to assist in entering data to the current user interface.

FIG. 7 is a screenshot illustrating an example user interface 150 presented by management device 10 for managing various network devices. In the example of FIG. 7, user interface 150 presents a list 152 of devices that can be managed by management device 10. List 152 includes devices that have not yet been activated. List 152 includes the name of each device as well as a color box corresponding to the color selected using color selection drop-down menu 124 (FIG. 6).

A user selects one of the devices of list 152 to manage the device. For example, the user may select a device by positioning a pointer over the name of the device and pressing a button, such as a mouse button. In the example of FIG. 7, a user has selected device "Master" corresponding to the device group for which information was entered using user interface 120. In response to selecting a device from list 152, user interface 150 presents management window 154 that presents a list of options that the user may select to manage the selected device. For example, for an inactivated device, the user selects "Activate Device" to activate the master device. In general, activating a master device causes management device 10 to enter a process by which the administrator is allowed to create a bulk configlet for the group of devices. When a user selects "Activate Device," management device 10 presents another user interface to continue developing the bulk configlet for the device, such as user interface 160 of FIG. 8.

Figure 8:
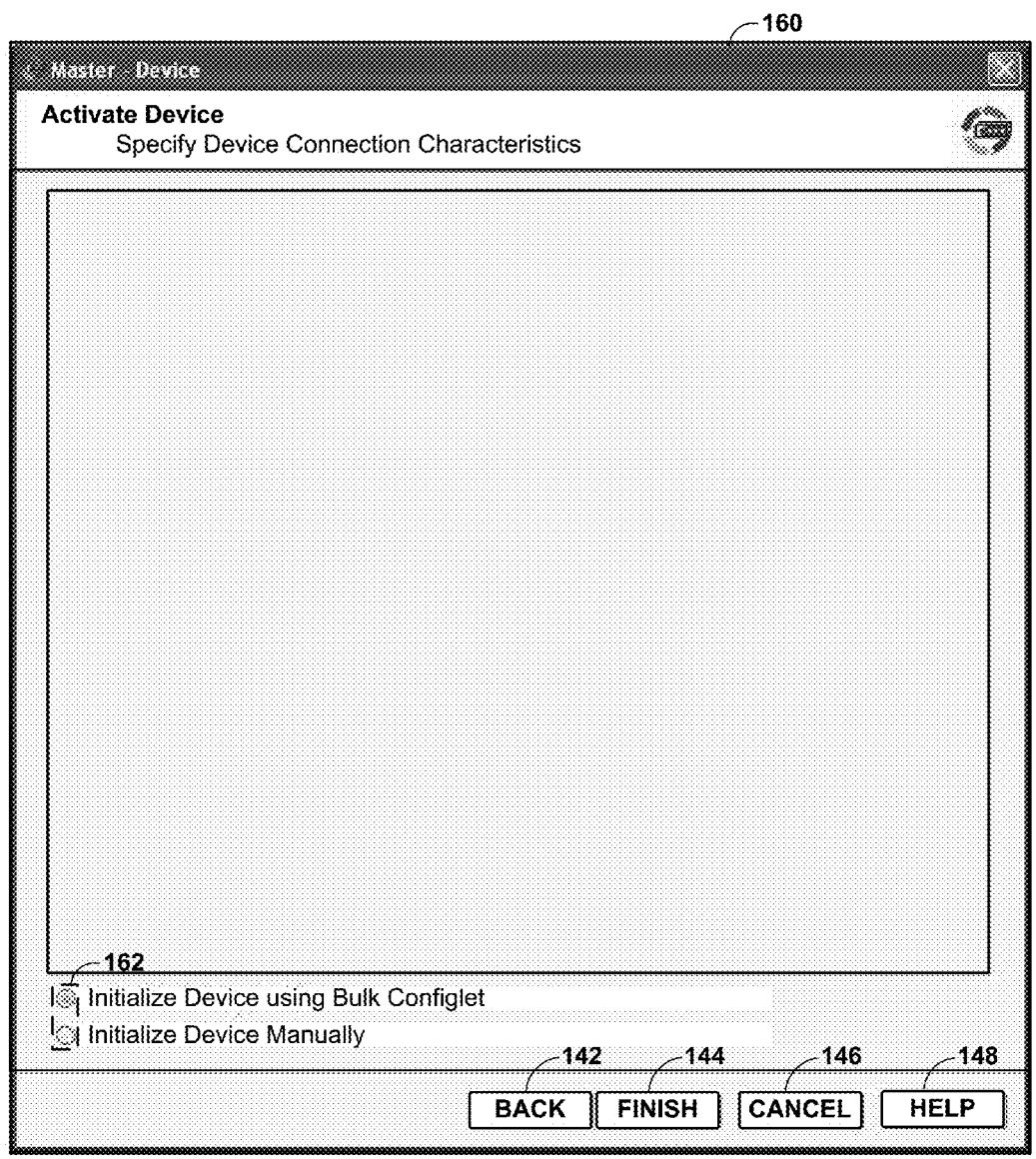

FIG. 8 is a screenshot illustrating an example user interface 160 by which the user specifies whether he wishes to create a bulk configlet or a device-specific configlet. As discussed above, management device 10 presents user interface 160 when a user selects "Activate Device" from the management window 154 (FIG. 7). In the example of FIG. 8, user interface 160 presents the user with options to either create a bulk configlet or to allow a remote administrator to manually configure the device. The user may choose between these options using radio buttons 162.

When the user selects "Initialize Device Manually," management device 10 creates a bulk configlet that includes only the commands required to connect to management device 10. A remote administrator of a device using such a bulk configlet will be required to manually configure the device. However, when the user selects "Initialize Device using Bulk Configlet," management device 10 presents user interface 170 of FIG. 9, which enables the user to continue the process of generating a bulk configlet.

Figure 9:
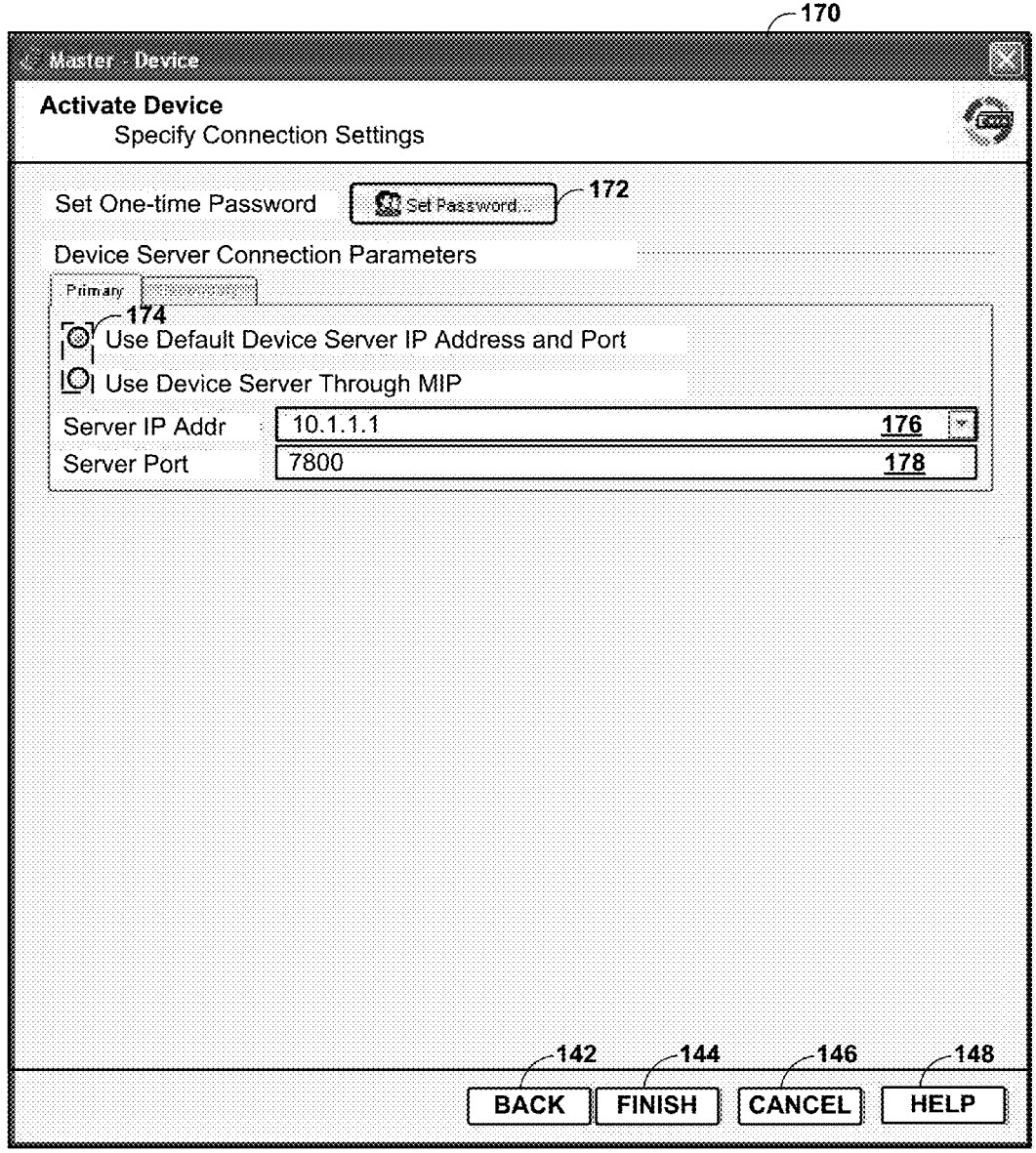

FIG. 9 is a screenshot illustrating an example user interface 170 for specifying network connection settings of a bulk configlet. In the example of FIG. 9, user interface 170 presents set one-time password button 172. When a user selects set one-time password button 172, user interface 170 presents a dialog box (not shown) to receive a one-time password from the user. In some examples, the user is also prompted to enter a username. Management device 170 stores the username and password as username/password 74 of bulk configlet 50 (FIG. 3).

User interface 170 also includes radio buttons 174, server IP address drop-down menu 176, and server port text field 178. User interface 170 may present these device connection parameter options using the data provided by the administrator by interacting with user interface 120 of FIG. 6. In some examples, the user may revise connection parameter options using user interface 170.

Figure 10:
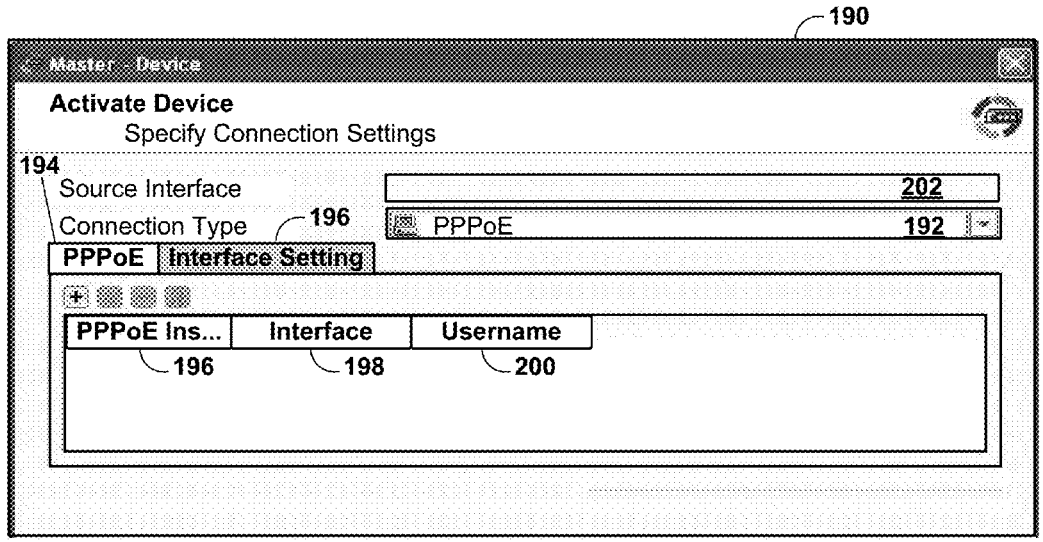

FIG. 10 is a screenshot illustrating an example user interface 190 presented by management device 10 for specifying additional network connection settings of a bulk configlet. User interface 190 displays source interface text field 202 and connection type drop-down menu 192. A user enters an identifier for a type of interface used by the server to connect to the network, e.g., an Ethernet or Gigabit Ethernet interface in source interface text field 202. The user also selects a connection type from connection type drop-down menu 192. In the example of FIG. 10, the user has selected "PPPoE." Connection type drop-down menu 192 may additionally include options to select "PPP" or "PPPoA," or other communication protocols.

User interface 190 also displays PPPoE tab 194 and interface setting tab 196. User interface 190 may display a communication protocol tab corresponding to the user's selection from connection type drop-down menu 192. For example, when a user selects "PPPoA" from connection type drop-down menu 192, user interface 190 replaces PPPoE tab 194 with a PPPoA tab (not shown). In the example of FIG. 10, PPPoE tab 194 is selected, as indicated by having a white background and interface setting tab 196 having a shaded background. The example of FIG. 11 presents user interface 190 with interface setting tab 196 selected, as discussed in greater detail below.

When PPPoE tab 194 is selected, e.g., as in FIG. 10, user interface 190 presents various settings to configure PPPoE for network devices 14. For example, user interface 190 presents PPPoE Instance drop-down menu 196, interface text field 198, and username text field 200. A user selects various configuration options for PPPoE from PPPoE Instance drop-down menu 196. Using PPPoE Instance drop-down menu 196, a user creates a PPPoE Instance and configures relevant parameters for the PPPoE instance. For example, the user enters a type of interface for network devices 14 using network text field 198 for the PPPoE instance. The user also specifies a username and password for bulk configlet 50 username/password 74 for the PPPoE instance.

Figure 11:
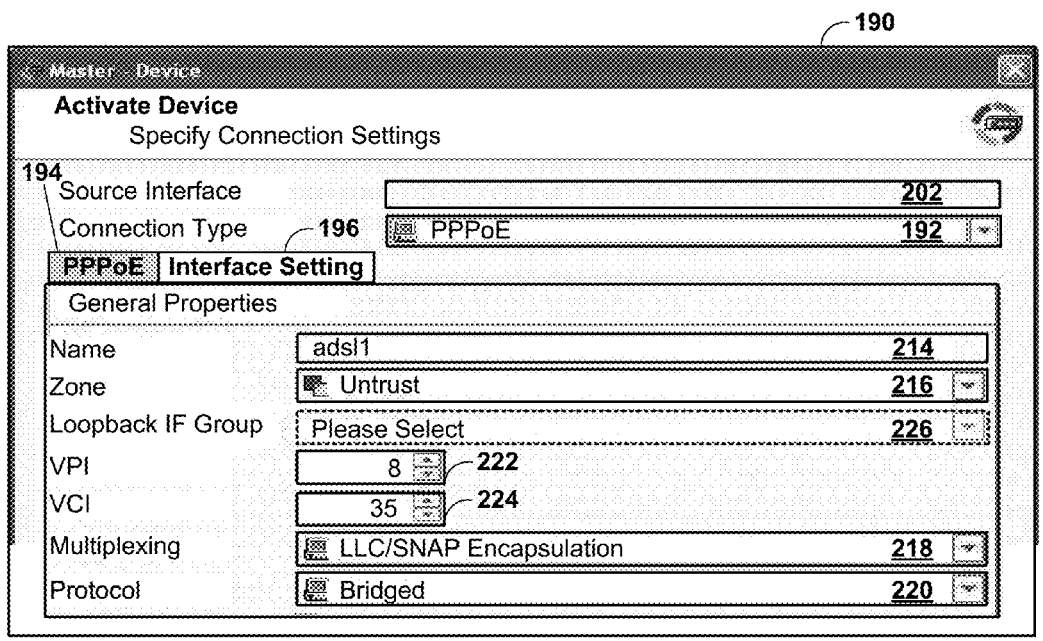

FIG. 11 is a screenshot illustrating another view of user interface 190 presented by management device 10 for specifying additional network connection settings of a bulk configlet. In the example of FIG. 11, interface settings tab 196 of user interface 190 is selected. Therefore, user interface 190 presents elements for manipulating interface settings of network devices 14. In particular, user interface 190 presents name text field 214, zone drop-down menu 216, loopback interface (IF) group 226, virtual path identifier (VPI) number field 222, virtual channel identifier (VCI) number field 224, multiplexing drop-down menu 218, and protocol drop-down menu 220.

The user enters a name for the interface configuration settings in name text field 214. In the example of FIG. 11, a user has entered a name of "adsl1." A user specifies a zone to which the interface is connected using zone drop-down menu 216. In the example of FIG. 11, a user has selected "Untrust" as the zone. Another option that may be displayed in zone drop-down menu 216 is "Trust." In this manner, a user classifies a particular interface of each of network devices 14 as belonging to a particular zone, for which various policies may be applied, such as security policies.

The user also selects a loopback interface group using loopback IF group drop-down menu 226. In general, the user selects a loopback interface group for the purpose of testing data transmission, to ensure that data is received. Some devices are not configured with a loopback interface group. In the example of FIG. 11, user interface 190 displays "Please Select" in, and a dashed line around, drop-down menu 226. The dashed line indicates that data for this field cannot be filled in for this particular device or interface.

VPI number field 222 and VCI number field 224 allow the user to enter a virtual path identifier and a virtual channel identifier, respectively. Some protocols, such as ATM, require a unique VPI/VCI pair for each interface connected to a network. The values for VPI and VCI received via user interface 190 correspond to the configuration data for the bulk configlet, and when each of network devices 14 connects to management device 10, management device 10 assigns individual VPI and VCI values to interfaces of network devices 14.

Multiplexing drop-down menu 218 enables a user to select a multiplexing protocol to enable a plurality of devices to each communicate over a common line. In the example of FIG. 11, a user has selected "LLC/SNAP Encapsulation" from multiplexing drop-down menu 218. Therefore the interface will encapsulate link-layer packets according to the LLC/SNAP (logical link control/sub-network access protocol) Encapsulation. Protocol drop-down menu 220 enables a user to select a protocol type for the interface. In the example of FIG. 11, the user has selected "Bridged."

Figure 12:
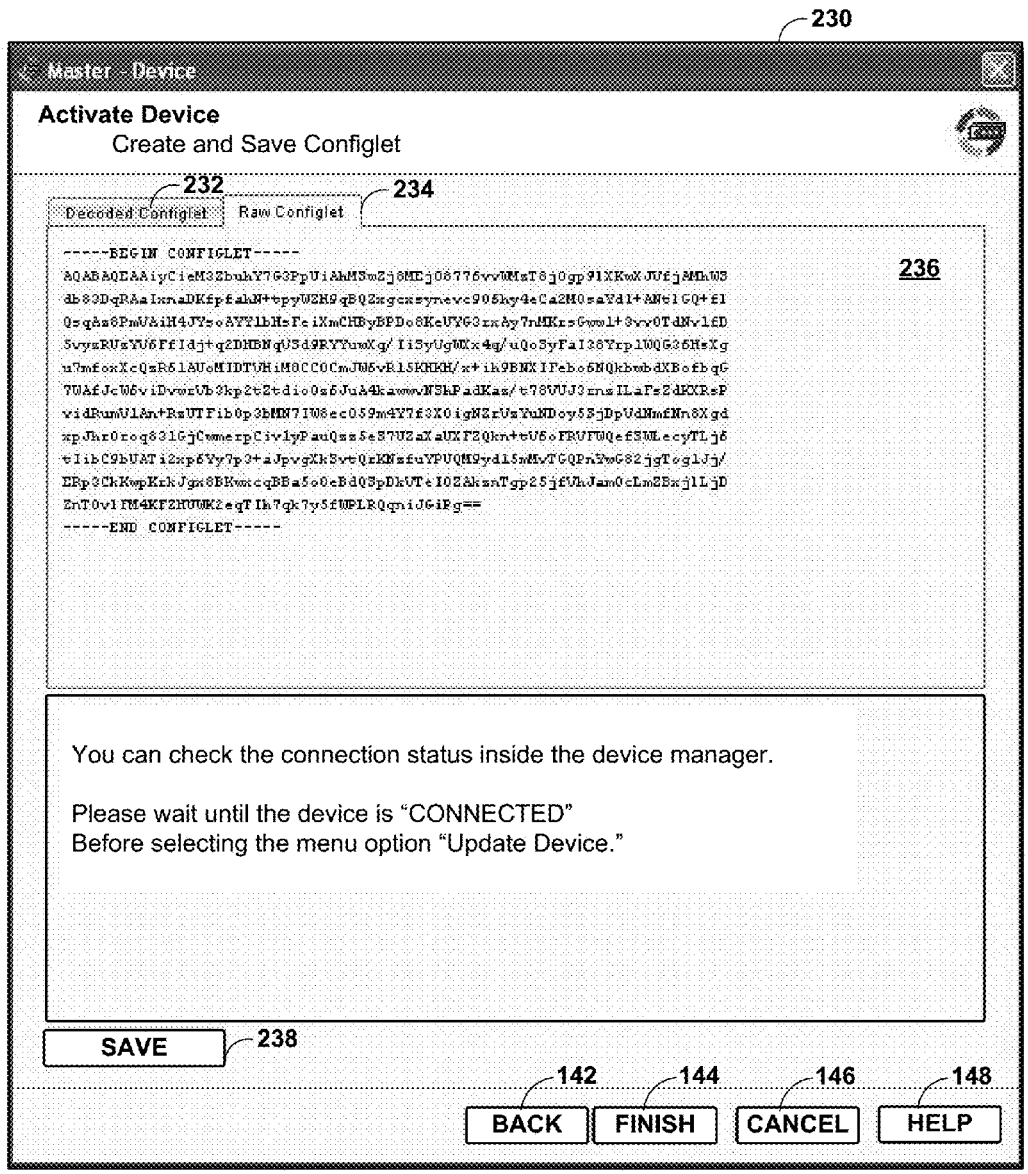

FIG. 12 is a screenshot illustrating an example user interface 230 presented by management device 10 for viewing and saving a bulk configlet once the bulk configlet has been configured. In the example of FIG. 12, user interface 230 displays decoded configlet tab 232 and raw configlet tab 234. When a user selects raw configlet tab 234, user interface 230 depicts an encoded version of the bulk configlet in text field 236, e.g., as shown in FIG. 12. When the user selects decoded configlet 232, user interface 230 depicts a decoded version of the bulk configlet in text field 236, e.g., XML data corresponding to the bulk configlet. When the user is satisfied with the bulk configlet, the user selects save button 238. When the user selects save button 238, management device 10 saves the encoded version of the bulk configlet to a computer-readable medium, e.g., a pen drive.

Figure 13:
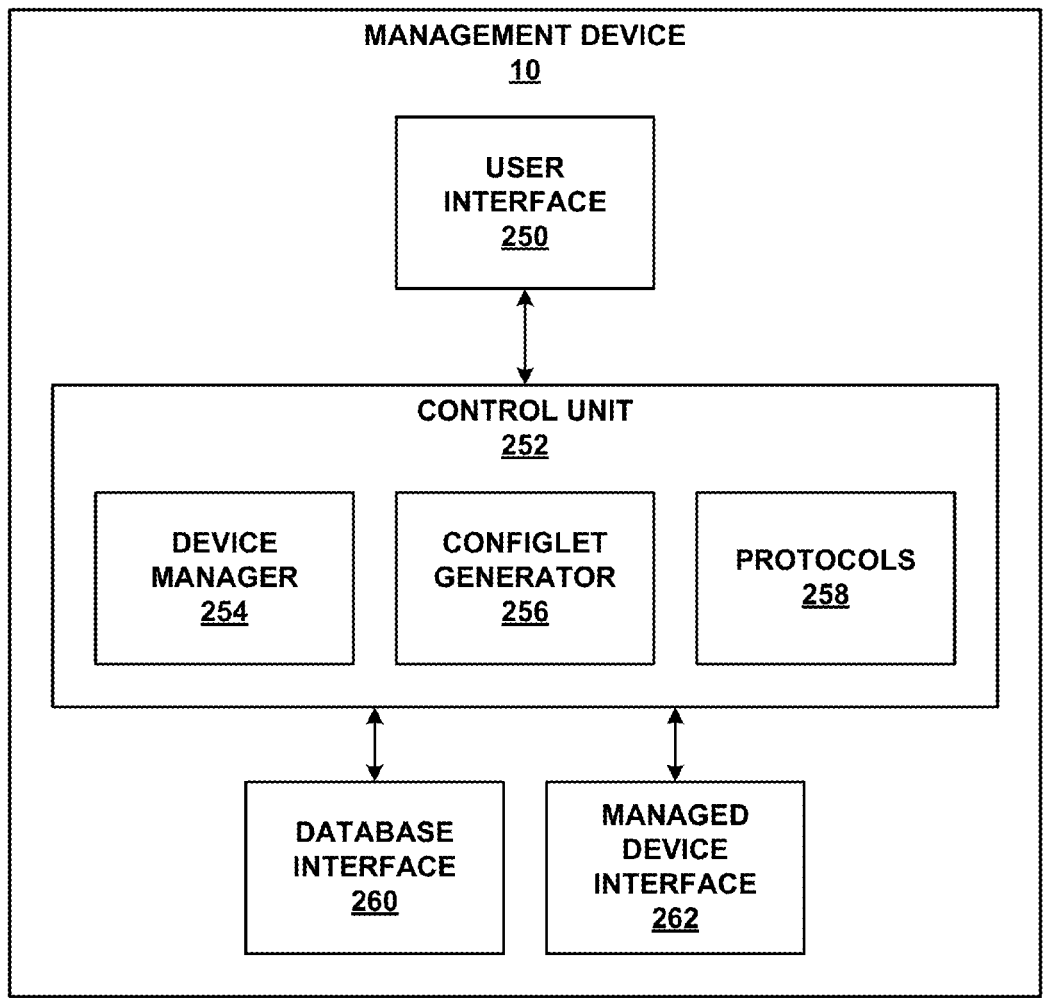
FIG. 13 is a block diagram illustrating an example management device that creates a bulk configlet and manages network devices that connect using the bulk configlet.

FIG. 13 is a block diagram illustrating an example management device that creates a bulk configlet and manages network devices that connect using the bulk configlet. In the example of FIG. 13, management device 10 includes user interface module 250, control unit 252, database interface 260, and managed device interface 262. User interface module 250 comprises instructions to send/receive data to/from one or more of a display, keyboard, mouse, stylus, touchscreen, or other interface for presenting and receiving data to/from a user. Administrator 12 interacts with management device 10 via user interface module 250 to create a bulk configlet for a group of network devices with similar configurations, such as network devices 14 (FIG. 1).

Control unit 252 comprises hardware for performing the techniques of this disclosure. For example, control unit 252 may comprise a processor, such as one or more programmable processors, microprocessors, application specific integrated circuits, field programmable gate arrays, digital signal processors, or other equivalent integrated or discrete logic circuitry. Control unit 252 may comprise one or more processors (not shown in FIG. 13) that execute software instructions, such as those used to define a software or computer program, stored to a computer-readable storage medium (again, not shown in FIG. 13), such as a storage device (e.g., a disk drive, or an optical drive), or memory (e.g., a Flash memory, random access memory or RAM) or any other type of volatile or non-volatile memory that stores instructions (e.g., in the form of a computer program or other executable) to cause a programmable processor to perform the techniques described herein. Alternatively, control unit 34 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described herein.

In the example of FIG. 13, control unit 252 comprises device manager 254, configlet generator 256, and protocols 258, which may comprise software modules executed by control unit 250 or discrete, independent hardware units of control unit 250. When any or all of device manager 254, configlet generator 256, and protocols 258 comprise software, e.g., executable software modules, instructions executable by a processor for device manager 254, configlet generator 256, and protocols 258 may be encoded in a computer-readable medium (not shown) of management device 10.

Device manager 254 interacts with one or more managed devices, e.g., network devices 14, to manage the network devices. In one example, device manager 254 executes an implementation of SNMP. Device manager 254 sends electrical signals to the managed network devices via managed device interface 262. Managed device interface 262 comprises one or more network interface cards. Therefore, device manager 254 sends and receives packets comprising data for managing the managed network devices indirectly via a network, such as the Internet, to, e.g., network devices 14.

When one of network devices 14, e.g., network device 14A, connects to management device 10, device manager 254 receives an identifier of network device 14A. Device manager 254 queries element database 16 with the identifier to determine a device object for network device 14A. When the response to the query indicates that the device object comprises bulk device object 26, device manager 254 pushes data from a next available one of device objects 22 to network device 14A and updates next device object identifier 24. Device manager 254 also associates network device 14A with the one of device objects 22.

Configlet generator 256 generates bulk configlets in accordance with the techniques of this disclosure, each of the bulk configlets being for a group of similar network devices. Configlet generator 256 receives data for generating a bulk configlet from a user via user interface module 250. For example, configlet generator 256 may send a signal to user interface module 250 to display the user interfaces of FIGS. 6-12 to retrieve data to generate a bulk configlet. Configlet generator 256 stores configuration data for the groups of devices to, and retrieves data from, element database 16 via database interface 260. Configlet generator 256 also stores a generated configlet to a computer-readable medium (not shown), such as a pen drive. Protocols 258 comprise one or more network protocols for communicating over a network. For example, protocols 258 may comprise PPP, PPPoE, and/or PPPoA for communicating with network devices 14.

Figure 14:
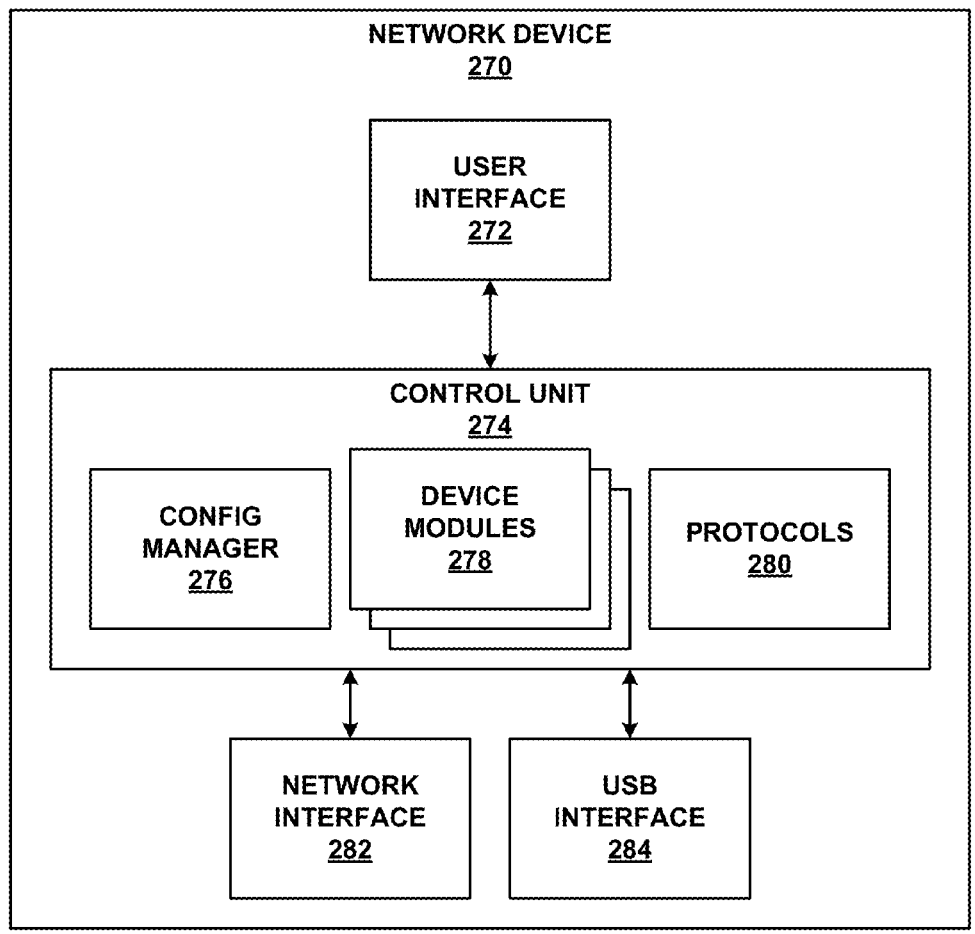
FIG. 14 is a block diagram illustrating an example network device that is configured using a bulk configlet.

FIG. 14 is a block diagram illustrating an example network device 270 that is configured by using a bulk configlet. Network device 270 corresponds to one of network devices 14 (FIG. 1). For example, network device 270 may correspond to a router, a bridge, a hub, a switch, a server, a printer, a gateway, a firewall, an IDP device, or other network device. In the example of FIG. 14, network device 270 includes user interface module 272, control unit 274, network interface 282, and USB interface 284. User interface module 272 comprises instructions to send/receive data to/from one or more of a display, keyboard, mouse, stylus, touchscreen, or other interface for presenting and receiving data to/from a user. In one example, network device 270 receives a hostname from a user via user interface module 272 when executing a bulk configlet.

Control unit 274 may comprise hardware for performing the techniques of this disclosure. For example, control unit 274 may comprise a processor, such as one or more programmable processors, microprocessors, application specific integrated circuits, field programmable gate arrays, digital signal processors, or other equivalent integrated or discrete logic circuitry. In the example of FIG. 14, control unit 274 comprises configuration (config) manager 276, device modules 278, and protocols 280, which may comprise software modules executed by control unit 274 or discrete, independent hardware units of control unit 274. When any or all of configuration manager 276, device modules 278, and protocols 280 comprise software, instructions executable by a processor for configuration manager 276, device modules 278, and protocols 280 may be encoded in a computer-readable medium (not shown) of network device 270.

Network interface 282 may comprise any interface for connecting to devices of a computer network, such as management device 10 (FIG. 1). For example, network interface 282 may comprise an Ethernet interface, a gigabit Ethernet interface, a telephone modem, a cable modem, a satellite modem, or other network interface. USB interface 284 comprises an interface for receiving a USB pen drive. In this manner, network device 270 may receive a pen drive encoded with instructions for a bulk configlet. In other examples, network device 270 may comprise other devices for receiving a computer-readable medium encoded with instructions for a bulk configlet such as, for example, a CD-ROM drive, a disk drive, or other interface for receiving a computer-readable medium encoded with a bulk configlet.

Configuration manager 276 loads instructions for a bulk configlet from a pen drive encoded with the bulk configlet via USB interface 284 (in the example of FIG. 14) when configuration manager 276 detects the presence of a bulk configlet. When a bulk configlet is not detected, configuration manager 276 instead loads a stored specific configuration from a computer-readable medium (not shown) of network device 270. Alternatively, in one example, when configuration manager 276 does not detect a specific configuration or a bulk configlet, configuration manager 276 sends a signal to user interface 272 to display a request to a user to connect a pen drive encoded with a bulk configlet to network device 270. Configuration manager 276 may execute the example method of FIG. 5 to configure network device 270 using a bulk configlet.

Device modules 278 generally correspond to components specific to network device 270. For example, when network device 270 comprises a router, device modules 278 may comprise a control plane that maintains a routing information base, a forwarding engine that maintains a forwarding information base, one or more routing protocols, or other modules required to route packets through a network. As another example, when network device 270 comprises a security device, device modules 278 may comprise a protocol decoder module, an application identification module, and an attack detection module, or other network security modules. Protocols 280 comprise one or more communication protocols for communicating with management device 10 and/or other network devices. For example, protocols 280 may comprise PPP, PPPoE, and/or PPPoA. Protocols 280 may also comprise one or more routing protocols, security protocols, or other protocols, depending upon the type of device to which network device 270 corresponds.

Figure 15:
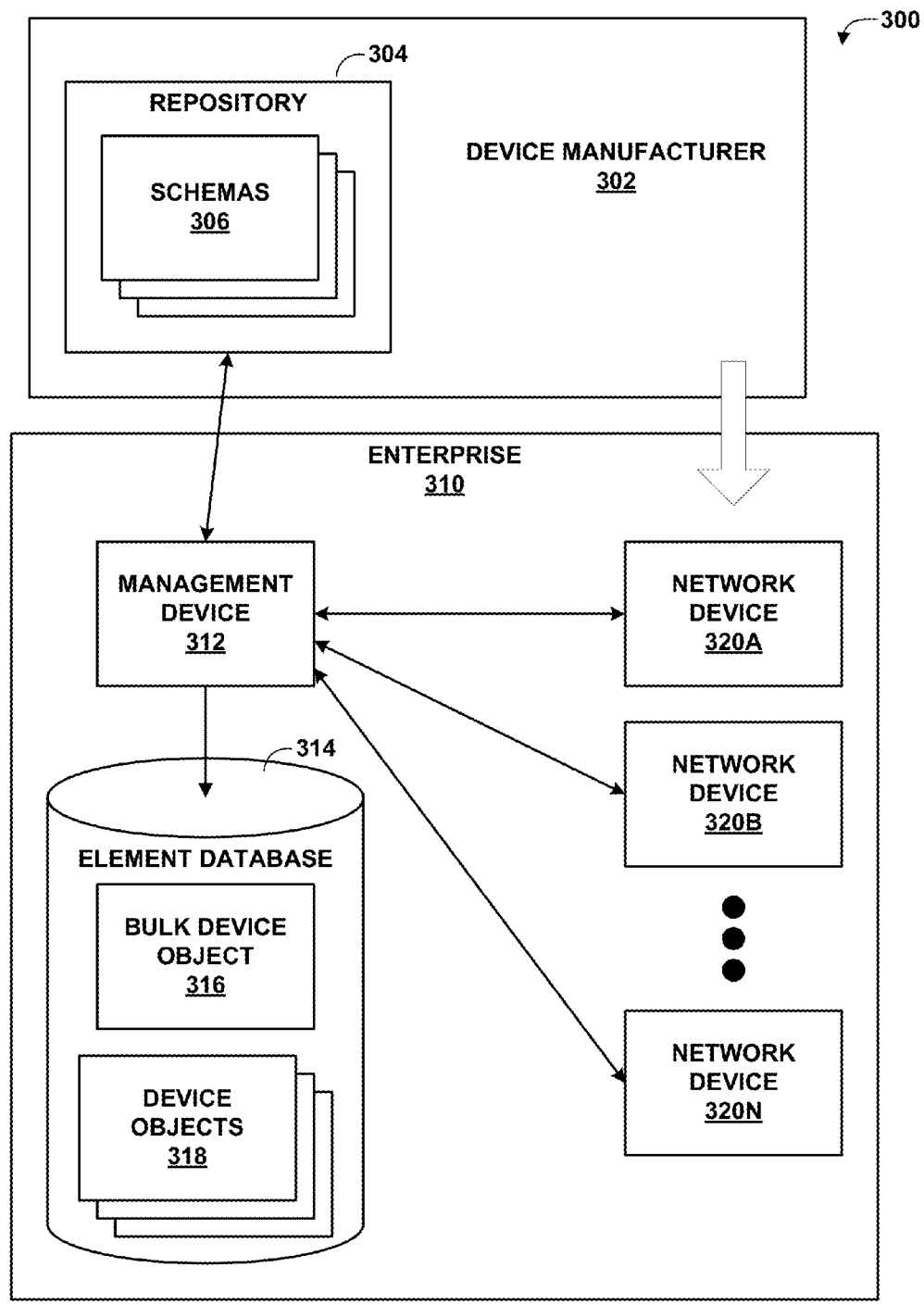
FIG. 15 is a block diagram illustrating an example system 300 in which a device manufacturer 302 provides a repository 304 of schemas 306 for various enterprises, such as enterprise 310.

FIG. 15 is a block diagram illustrating an example system 300 in which a device manufacturer 302 provides a repository 304 of schemas 306 for various enterprises, such as enterprise 310. Enterprise 310 may correspond to the enterprise discussed above with respect to FIG. 1. In the example of FIG. 15, enterprise 310 includes management device 312, element database 314, and network devices 320A-320N (network devices 320). As discussed above, an administrator (not shown) uses management device 312 to generate a plurality of device objects 318, as well as a bulk device object 318. Bulk device object 318 includes data corresponding to data for a bulk configlet used to initialize network devices 320.

Device manufacturer 302 manufactures each of network devices 320. Network devices 320 are each similar in that they comprise the same platform and the same operating system, as discussed above. In the example of FIG. 15, designers (not shown) at device manufacturer 302 also develop one of schemas 306 for network devices 320. The designers also store each of schemas 306 in a repository 304. Repository 304 is accessible by customers of device manufacturer 302, such as enterprise 310. Other enterprises are also able to access repository 304 to download one or more of schemas 306. In one example, repository 304 corresponds to a web server from which the customers may retrieve one or more of schemas 306. When a plurality of enterprises each receive similar network devices, each of the enterprises are able to retrieve the one of schemas 306 corresponding to those network devices. Thus a plurality of enterprises may each retrieve the same one of schemas 306, when each of the enterprises purchases network devices corresponding to that one of schemas 306.

As discussed above, a schema includes data that describes requirements of an implemented bulk configlet. In one example, each of schemas 306 comprises an XML XSD file. An administrator of enterprise 310, in one example, retrieves one of schemas 306 corresponding to network devices 320 after generating a bulk configlet to validate the bulk configlet. In another example, the administrator uploads the bulk configlet to repository 304 for validation and receives a response for repository 304 as to whether or not the bulk configlet is valid, according to a corresponding one of schemas 306. In this manner, schemas 306 are used to validate contents of a bulk configlet, such as a bulk configlet used to activate network devices 320.

In general, validation involves comparing an implemented bulk configlet against a corresponding one of schemas 306 to ensure that requirements in the schema are fulfilled by the bulk configlet. For example, when one of schemas 306 requires that a bulk configlet include a password field, validation of a bulk configlet for the one of schemas 306 includes ensuring that a password has been defined for the bulk configlet. In this manner, device manufacturer 302 may ensure that data required to activate network devices 320 exists in the created bulk configlet. Therefore, device manufacturer 302 is able to maintain at least some level of control over the contents of a bulk configlet created by an administrator of enterprise 310, as well as other enterprises (not shown), in order to active network devices 320 or other network devices similar to network devices 320.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

The invention claimed is:

1. A method comprising:
generating, with a management device, a bulk configlet executable by a plurality of network devices to be managed by the management device, wherein the bulk configlet specifies a bulk identifier associated with the plurality of network devices, wherein the bulk identifier is associated with information on the management device indicating that specific configuration information is to be sent to the plurality of network devices in response to receiving network session requests from the plurality of network devices specifying the bulk identifier as an identifier for the plurality of network devices, and wherein the bulk configlet is configured to cause, during execution, each of the plurality of network devices to initialize a respective network stack and connect to the management device over a network using the network stack;
receiving, with the management device, a network session request from one of the plurality of network devices via the network, wherein the network session request specifies the bulk identifier as an identifier for the one of the plurality of network devices; and
based on the network session request specifying the bulk identifier, sending, with the management device, specific configuration data, to replace the bulk configlet, to the one of the plurality of network devices in response to receiving the network session request that specifies the bulk identifier, wherein the specific configuration data includes a specific identifier to replace the bulk identifier, and wherein the specific configuration data is configured to cause, during execution, the one of the plurality of network devices to reconnect to the management device using the specific identifier and to become fully enabled.

2. The method of claim 1, further comprising assigning an Internet protocol address to the one of the plurality of network devices according to Dynamic Host Configuration Protocol.

3. The method of claim 1, wherein the network session request comprises a first network session request, wherein the one of the plurality of network devices comprises a first one of the plurality of network devices, and wherein sending specific configuration data comprises sending a first set of specific configuration data to the one of the plurality of network devices, the method further comprising:
  receiving a second network session request from a second one of the plurality of network devices, wherein the second network session request includes the bulk identifier; and
  sending a second set of specific configuration data to the one of the plurality of network devices, wherein the second set of specific configuration data differs from the first set of specific configuration data.

4. The method of claim 1, further comprising:
  receiving a schema that defines one or more requirements for the bulk configlet with respect to the plurality of network devices; and
  validating, with the management device, the generated bulk configlet against the received schema.

5. The method of claim 4, wherein the received schema defines a minimum number of occurrences for at least one element of the bulk configlet.

6. The method of claim 4, wherein the received schema defines a maximum number of occurrences for at least one element of the bulk configlet.

7. The method of claim 4, wherein the received schema comprises an extensible markup language (XML) schema, and wherein the generated bulk configlet comprises an XML file.

8. The method of claim 4, wherein the received schema defines an ask-info element for the bulk configlet, and wherein generating the bulk configlet comprises generating an ask-info element for the bulk configlet, wherein the ask-info element of the bulk configlet is configured to cause a network device executing the bulk configlet to prompt a user for data for the corresponding element.

9. The method of claim 8, wherein the ask-info element of the bulk configlet comprises a hostname ask-info element that is configured to cause a network device executing the bulk configlet to prompt a user for a network hostname to be used by the network device.

10. The method of claim 1, further comprising maintaining, with the management device, a plurality of device objects in a database, wherein at least a portion of the plurality of device objects corresponds to the plurality of network devices, and wherein the device objects correspond to elements of a network model for a network including the plurality of network devices.

11. The method of claim 10, further comprising:
  receiving a number N defining a number of the plurality of network devices;
  generating, within the network model, N device objects comprising the plurality of device objects in the database before receiving any network session request from any of the plurality of network devices; and
  generating, within the network model, a bulk device object to represent the device objects in the database,
  wherein sending specific configuration data comprises retrieving configuration data from one of the plurality of device objects that is next available, associating the one of the plurality of device objects with the one of the plurality of network devices, and updating a next available device object pointer to identify a second next available one of the plurality of device objects.

12. The method of claim 10, further comprising:
  dynamically creating, within the model, one of the plurality of device objects upon receiving the network session request, wherein maintaining the plurality of device objects comprises adding the dynamically created one of the plurality of device objects to the database and associating the one of the plurality of network devices with the dynamically created one of the plurality of device objects,
  wherein sending specific configuration data comprises sending configuration data from the dynamically created one of the plurality of device objects to the one of the plurality of network devices as the specific configuration data.

13. The method of claim 10, wherein maintaining a plurality of device objects comprises assigning a unique Internet protocol address and a unique device name to each of the plurality of device objects.

14. A management device comprising:
  a computer-readable medium encoded with instructions for a configlet generator module and a device manager module; and
  a processor to execute modules stored in the computer-readable medium of the management device;
  wherein the processor executes the configlet generator module to generate a bulk configlet executable by a plurality of network devices to be managed by the management device, wherein the bulk configlet specifies a bulk identifier associated with the plurality of network devices, wherein the bulk identifier is associated with information on the management device indicating that specific configuration information is to be sent to the plurality of network devices in response to receiving network session requests from the plurality of network devices specifying the bulk identifier as an identifier for the plurality of network devices, and wherein the bulk configlet is configured to cause, during execution, each of the plurality of network devices to initialize a respective network stack and connect to the management device over a network using the network stack, and
  wherein the processor executes the device manager module to receive a network session request from one of the plurality of network devices via the network, wherein the network session request specifies the bulk identifier as an identifier for the one of the plurality of network devices, and based on the network session request specifying the bulk identifier, to send specific configuration data, to replace the bulk configlet, to the one of the plurality of network devices in response to the network session request that specifies the bulk identifier, wherein the specific configuration data includes a specific identifier to replace the bulk identifier, and wherein the specific configuration data is configured to cause, during execution, the one of the plurality of network devices to reconnect to the management device using the specific identifier and to become fully enabled.

15. The management device of claim 14, wherein the specific configuration data sent by the device manager module comprises a specific Internet protocol address for the one of the plurality of network devices.

16. The management device of claim 14, wherein the configlet generator module is configured to receive a schema that defines one or more requirements for the bulk configlet with respect to the plurality of network devices and to validate the generated bulk configlet against the received schema.

17. The management device of claim 16, wherein the schema defines a hostname ask-info element, and wherein the bulk configlet generator module is configured to generate the bulk configlet to include a hostname ask-info element that is configured to cause a network device executing the bulk configlet to prompt a user for a network hostname to be used by the network device.

18. The management device of claim 14, further comprising a database interface, wherein the device manager module is further configured to maintain a plurality of device objects in a database via the database interface, wherein at least a portion of the plurality of device objects corresponds to the plurality of network devices, and wherein the device objects correspond to elements of a network model for a network including the plurality of network devices.

19. The management device of claim 18, wherein the configlet generator module is configured to receive a number N corresponding to a number of the plurality of network devices, and wherein the device manager is configured to generate, within the network model, N device objects as the plurality of device objects and to assign a unique Internet protocol address and a unique device name to each of the plurality of device objects, wherein the device objects represent respective ones of the plurality of network devices, and
wherein the device manager module is configured to associate the one of the plurality of network devices with one of the plurality of device objects that is available and to send configuration data comprising the corresponding unique Internet protocol address and the unique device name from the one of the plurality of device objects as the specific configuration data to the one of the plurality of network devices.

20. A non-transitory computer-readable medium encoded with instructions for causing a programmable processor of a management device for managing a plurality of network devices to be managed by the management device to:
generate a bulk configlet executable by the plurality of network devices, wherein the bulk configlet specifies a bulk identifier associated with the plurality of network devices, wherein the bulk identifier is associated with information on the management device indicating that specific configuration information is to be sent to the plurality of network devices in response to receiving network session requests from the plurality of network devices specifying the bulk identifier as an identifier for the plurality of network devices, and wherein the bulk configlet is configured to cause, during execution, each of the plurality of network devices to initialize a respective network stack and connect to the management device over a network using the network stack;
receive a network session request from one of the plurality of network devices via the network, wherein the network session request specifies the bulk identifier as an identifier for the one of the plurality of network devices; and
based on the network session request specifying the bulk identifier, send specific configuration data, to replace the bulk configlet, to the one of the plurality of network devices in response to the received network session request that specifies the bulk identifier, wherein the specific configuration data includes a specific identifier to replace the bulk identifier, and wherein the specific configuration data is configured to cause, during execution, the one of the plurality of network devices to reconnect to the management device using the specific identifier and to become fully enabled.

21. The non-transitory computer-readable medium of claim 20, wherein the specific configuration data comprises a specific Internet protocol address for the one of the plurality of network devices.

22. The non-transitory computer-readable medium of claim 20, further comprising instructions to:
receive a schema that defines one or more requirements for the bulk configlet with respect to the plurality of network devices; and
validate the generated bulk configlet against the received schema.

23. The non-transitory computer-readable medium of claim 22, wherein the received schema defines a hostname ask-info element, and wherein the instructions to generate the bulk configlet comprise instructions to include in the bulk configlet a hostname ask-info element that is configured to cause a network device executing the bulk configlet to prompt a user for a network hostname to be used by the network device.

24. The non-transitory computer-readable medium of claim 20, further comprising instructions to:
receive a number N corresponding to a number of the plurality of network devices; and
generate, within a network model for a network including the plurality of network devices, N device objects to represent one or more of the plurality of network devices, wherein the instructions to generate the N device objects comprise instructions to assign a unique Internet protocol address and a unique device name to each of the device objects,
wherein the instructions to send specific configuration data comprise instructions to associate the one of the plurality of network devices with one of the plurality of device objects that is available and instructions to send configuration data comprising the corresponding unique Internet protocol address and the unique device name from the one of the plurality of device objects as the specific configuration data to the one of the plurality of network devices.

25. A system comprising:
a plurality of network devices;
a management device comprising:
a computer-readable medium encoded with instructions for a configlet generator module and a device manager module; and
a processor to execute modules stored in the computer-readable medium of the management device;
wherein the processor executes the configlet generator module to generate a bulk configlet executable by the plurality of network devices, wherein the plurality of network devices are to be managed by the management device, wherein the bulk configlet specifies a bulk identifier associated with the plurality of network devices, wherein the bulk identifier is associated with information on the management device indicating that specific configuration information is to be sent to the plurality of network devices in response to receiving network session requests from the plurality of network devices specifying the bulk identifier as an identifier for the plurality of network devices, wherein the processor executes the configlet generator module to encode the bulk configlet to a second computer-readable medium, and wherein the bulk configlet is configured to cause, during execution, each of the plurality of network devices to initialize a respective network stack and connect to the management device over a network using the network stack, and
wherein the processor executes the device manager module to receive a network session request from one of the plurality of network devices via the network, wherein the network session request specifies the bulk identifier, and based on the network session request specifying the bulk identifier, to send specific configuration data, to replace the bulk configlet, to the one of the plurality of network devices in response to the network session request that specifies the bulk identifier, wherein the specific configuration data comprises a unique Internet protocol address and a unique device name, wherein the specific configuration data includes a specific identifier to replace the bulk identifier, and wherein the specific configuration data is configured to cause, during execution, the one of the plurality of network devices to reconnect to the management device and to become fully enabled, wherein the one of the plurality of network devices is configured to load the bulk configlet from the second computer-readable medium, execute the bulk configlet, send the bulk identifier to the management device during execution of the bulk configlet, receive the specific configuration data from the management device in response to sending the bulk identifier to the bulk configlet, store the specific configuration data, and execute the specific configuration data to reconnect to the management device using the specific identifier and become fully enabled.

26. A method comprising:

loading, with a network device, a bulk configlet;

executing the bulk configlet during a boot cycle to initialize a network stack, extract a bulk identifier from the bulk configlet, and establish a network session with a management device, wherein the bulk identifier is associated with a plurality of network devices, including the network device, to be managed by the management device, and wherein the bulk identifier is associated with information on the management device indicating that specific configuration information is to be sent to the plurality of network devices in response to receiving network session requests from the plurality of network devices specifying the bulk identifier as an identifier for the plurality of network devices;

sending the bulk identifier of the bulk configlet, over a network using the network stack, to the management device during execution of the bulk configlet to cause the management device to send specific configuration data to the network device;

receiving the specific configuration data from the management device, via the network, in response to sending the bulk identifier to the management device, wherein the specific configuration data includes a specific identifier to replace the bulk identifier, and wherein the specific configuration data replaces the bulk configlet; and executing the specific configuration data to reconnect to the management device using the specific identifier and to become fully enabled.

27. The method of claim 26, wherein executing the bulk configlet comprises receiving a hostname from a user to use during the network session.

28. The method of claim 26, wherein executing the bulk configlet comprises establishing the network session with the bulk identifier as a device name for the network device.

29. The method of claim 1, wherein the bulk configlet includes information to be used when constructing the network stack.

30. The method of claim 29, wherein the information comprises instructions for obtaining an Internet protocol (IP) address, wherein the bulk configlet is configured to cause each of the plurality of network devices to use the IP address obtained according to the instructions for obtaining the IP address until receiving the specific configuration information, and wherein the specific configuration information includes a specific IP address for the one of the plurality of network devices to replace the IP address obtained according the instructions of the bulk configlet.

31. The method of claim 30, further comprising receiving a network communication from the one of the plurality of network devices, wherein the network communication indicates the specific IP address as the IP address for the one of the plurality of network devices.

32. The method of claim 1, wherein the plurality of network devices comprises a first plurality of network devices, wherein the bulk configlet comprises a first bulk configlet, and wherein the bulk identifier comprises a first bulk identifier, the method further comprising:

generating a second bulk configlet executable by a second plurality of network devices to be managed by the management device, wherein the second bulk configlet specifies a second bulk identifier associated with the second plurality of network devices, wherein the second bulk configlet is associated with information on the management device indicating that specific configuration information is to be sent to the second plurality of network devices in response to receiving network session requests from the second plurality of network devices specifying the second bulk identifier as an identifier for the second plurality of network devices, and wherein the second bulk configlet is configured to cause, during execution, each of the second plurality of network devices to initialize a respective network stack and connect to the management device over the network using the network stack;

in response to receiving a second network session request from a second network device:

determining an identifier specified in the second network session request;

in response to determining that the identifier comprises the first bulk identifier, sending specific configuration information associated with the first plurality of network devices to the second network device;

in response to determining that the identifier comprises the second bulk identifier, sending specific configuration information associated with the second plurality of network devices to the second network device; and in response to determining that the identifier comprises a specific identifier, managing the second network device.

* * * * *